(12) United States Patent
Kelly et al.

(10) Patent No.: US 7,464,055 B2
(45) Date of Patent: Dec. 9, 2008

(54) SYSTEM AND METHOD FOR MONITORING TRADES OUTSIDE OF A NO-BUST RANGE IN AN ELECTRONIC TRADING SYSTEM

(75) Inventors: Matthew J. Kelly, Western Springs, IL (US); Mazen Chadid, Chicago, IL (US); Elizabeth D. Freeman, Evanston, IL (US); Robert J. Wilcox, Chicago, IL (US); Mahesh G. Hira, Glenn Ellyn, IL (US)

(73) Assignee: Chicago Mercantile Exchange, Chicago, IL (US)

( * ) Notice: Subject to any disclaimer, the term of this patent is extended or adjusted under 35 U.S.C. 154(b) by 1129 days.

(21) Appl. No.: 10/405,025

(22) Filed: Mar. 28, 2003

(65) Prior Publication Data

US 2004/0193527 A1  Sep. 30, 2004

(51) Int. Cl.
*G06Q 40/00* (2006.01)
(52) U.S. Cl. ...................................................... 705/37
(58) Field of Classification Search .............. 705/35–37
See application file for complete search history.

(56) References Cited

U.S. PATENT DOCUMENTS

| 4,903,201 | A |  | 2/1990 | Wagner | |
|---|---|---|---|---|---|
| 4,980,826 | A | * | 12/1990 | Wagner | 705/37 |
| 7,228,289 | B2 | * | 6/2007 | Brumfield et al. | 705/35 |
| 2002/0111896 | A1 | * | 8/2002 | Ben-Levy et al. | 705/37 |
| 2002/0128945 | A1 | * | 9/2002 | Moss et al. | 705/37 |
| 2002/0156719 | A1 | * | 10/2002 | Finebaum et al. | 705/37 |
| 2002/0174056 | A1 | * | 11/2002 | Sefein et al. | 705/37 |
| 2003/0041000 | A1 | * | 2/2003 | Zajac et al. | 705/37 |
| 2003/0093362 | A1 | * | 5/2003 | Tupper et al. | 705/37 |
| 2003/0172024 | A1 | * | 9/2003 | Kokis et al. | 705/37 |

(Continued)

OTHER PUBLICATIONS

"Code of Federal Regulations," Commodity and Securities Exchanges, Apr. 1, 1983, Parts 1-239, pp. 1-150 (Part 1).

(Continued)

*Primary Examiner*—James Kramer
*Assistant Examiner*—Kevin Poe
(74) *Attorney, Agent, or Firm*—Brinks, Hofer, Gilson & Lione

(57) ABSTRACT

An alert system that notifies an Exchange's staff of a trade that appears to be outside of an expected market range of prices includes an input device, determination logic, evaluation logic, and alert logic. The determination logic derives a theoretical no-bust range of prices based on data received from the input device. The theoretical no-bust range of prices are prices above and below a synthesized market price, within which an erroneous trade cannot be cancelled. The evaluation logic monitors trades and compares those trades to the theoretical no-bust range of prices. The alert logic notifies the Exchange's staff when the evaluation logic identifies a potentially erroneous trade that lies outside the theoretical no-bust range of prices. A method of notifying the Exchange of a trade that potentially lies outside of an expected range of prices includes monitoring an input range of prices and deriving the theoretical no-bust range of prices. The method then compares transactions prices to the theoretical no-bust range of prices and notifies the Exchange when a potentially erroneous trade can be cancelled.

64 Claims, 13 Drawing Sheets

U.S. PATENT DOCUMENTS

| | | | |
|---|---|---|---|
| 2003/0182224 A1* | 9/2003 | Horrigan et al. | 705/37 |
| 2003/0236737 A1* | 12/2003 | Kemp et al. | 705/37 |
| 2004/0002913 A1* | 1/2004 | Breen et al. | 705/37 |
| 2004/0117292 A1* | 6/2004 | Brumfield et al. | 705/37 |
| 2004/0236668 A1* | 11/2004 | Toffey | 705/37 |
| 2005/0096931 A1* | 5/2005 | Baker et al. | 705/1 |
| 2005/0149429 A1* | 7/2005 | Kemp et al. | 705/37 |
| 2007/0156574 A1* | 7/2007 | Marynowski et al. | 705/37 |

OTHER PUBLICATIONS

"Code of Federal Regulations," Commodity and Securities Exchanges, Apr. 1, 1983, Parts 1-239, pp. 151-322 (Part 2).
Teweles and Bradley, "The Stock Market," Fourth Edition, 1982, John Wiley & Sons, Inc., pp. 136-179.
Melamed, Leo, "Automation in the Futures Industry" Proceedings of a Conference Sponsored by Commodity Futures Trading Commission, Jun. 15, 1977, Washington, D.C., pp. 1-3 and 273-283.
Atken and Berry, "Surveillance Literature . . . Market Surveillance at the Australian Stock Exchange: An Overview", 5th Draft, Jul. 1991, pp. 1-21.
Barish and Siff, "Operational Gaming Simulation With Application To A Stock Market," Management Science, Journal of the Institute of Management Sciences, vol. 15, No. 10, Jun. 1969, pp. B-530-B-541.
Garman, Mark B., "A Description of an Experimental Securities Exchanges" University of California, Berkeley, Mar. 1975, revised Oct. 1975, pp. 1-17 and Appendix pp. 1-3.
"Automated Bonds System (ABS), User Manual", The New York Stock Exchange, Floor Operations Department, Feb. 27, 1976, 75 pages.
French and Roll, "Journal of Financial Economics the Arrival of Information and Reaction of Traders", Stock Return Variances Elsevier Science Publishers B.V. (North Holland), 1986, pp. 5-27.
Blume, Siegel and Rottenberg, revolution on wall Street, the Rise and Decline of the New York Stock Exchange, "Chapter 11: Technology and the Marketplace", W.W. Norton & Company, New york and London, 1993, pp. 192-214.
Letter to George A. Fitzsimmons, Securities and Exchanged Commission, Apr. 30, 1976, pp. 1-4.
Williams, Arlington W., "Computerized Double-Auction Markets: Some Initial Experimental Results," The Journal of Business, The Graduate School of Business of the University of Chicago, vol., No. 3, Part 1, Jul. 1980, pp. 235-258.
Carrington, "Computer Linkups Letting Traders Start Up Securities Firms at Home," The Wall Street Journal, Wednesday, Dec. 9, 1981, p. 33.
Bleiberg, Robert M., "Market Winner, Financial Futures Have Scored Remarkable Gains," Barron's National Business and Financial Weekly, Dow Jones & Company, Inc., Nov. 30, 1981, p. 7.
Ettore, Barbara, "Faces Behind The Figures", Forbes, Aug. 30, 1982, p. 139.
Wall Street Letter, Aug. 30, 1982, p. 7.
Wall Street Letter, Aug. 2, 1982, p. 3.
Dunne, Nancy, "Dawn of Electronic Age For Futures", London Financial Times, Wednesday, Dec. 23, 1981, p. 1.
"INTEX Update for Members", Nov., 1982, p. 1.
Witcher, S. Karene, "New Exchange Plans Commodity Trading Through Computers: Intex Won't Have Noisy Floor When it Offers Contracts on Gold and Bonds", Update: The Wall Street Journal, Thursday, Aug. 5, 1982, p. 1.
Gampetro, Tony, "Intex Unveils Trade Contracts", Journal of Commerce, Thursday, Aug. 5, 1982, p. 1.
"Testimony of K. Richard B. Niehoff, President of Cincinnati Stock Exchange", Washington, D.C. Sep. 24, 1979, pp. 1-10.
Peake, Mendelson, and Williams, "the National Book System, An Electrically Assisted Auction Market", (Together with letter of transmittal to the Securities and Exchange Commission, In response to Release No. 12159/Mar. 2, 1976), Apr. 30, 1976, 114 pages.
"A Feasibility Study for the Toronto Stock Exchange", Jun. 12, 1970, pp. 1-165 and Appendix 1-14.

"Good-bye to the pits?, Intex may not put the commodity pits out of business, but lots of members have signed up -- just in case it catches on", Financial World, Feb. 28, 1983, pp. 35-37.
Morris, John, "Contracts are Listed for Bermuda's Exchange", American Banker, Oct. 20, 1981, 4 pages.
"INTEX, This new Exchange is the fastest and most accurate futures trading system anywhere-and it's world-wide. That's INTEX. Yes, that's INTEX", Bermuda, Jun. 17, 1982, p. 1.
"INTEX Update for Members", Sep. 15, 1982, pp. 1-2.
"The U.S. National Market System: Progress, Problems, and Issues", Remarks by William M. Batten, Nov. 13, 1980, pp. 1-23.
"News Release, The New York Stock Exchange, NYSE Chairman Cites Progress On National Market System", Sep. 24, 1979, pp. 1-4.
"Remarks by William M. Batten, Chairman, New York Stock Exchange, Inc. Before the Committee on Oversight and Investigations and the Subcommittee on Consumer Protection and Finance of the Committee on Interstate and Foreign Commerce of the House of Representatives", Sep. 24, 1979, pp. 1-6.
"An Assessment of Progress Toward the Development of a National Market System", Sep. 24, 1979, pp. 1-20.
"House Scrutinizes Pace of National Market System Formualtion," Securities Industry Association, Washington Report, Oct. 1, 1979, p. 1.
Melton, William C., "Corporate Equities and the National Market System," Federal Reserve Bank of New York, vol. 3, No. 4, 1978-79, pp. 13-25.
"Memo to All NASD Members, regarding Commencement of Trade Reporting in National Market System Tier 1 Securities", Feb. 12, 1982, 10 pages.
"First Annual National Market System Conference", Plaza Hotel New York, Jun. 15-17, 1978, pp. 1-90.
Fuller and Simon, "The National Market System In Perspective: A Selective Outline of Significant Events", May 15, 1978, 56 pages.
Melton, William C., "Corporate Equities and the National Market System", FRBNY Quarterly Review/Winter 1978-79, pp. 13-25.
"The Battle for a National Market System", Wall Street Journal, Tuesday, Jun. 1, 1982, p. 1.
Williams, Harold M., "The National Market System in Perspective", Dec. 1, 1977, pp. 1-22.
"Instructions for Trade Reporting and entry of Size in the Nasdaq/National Market System", Feb., 1982, 20 pages.
"A Report of Progress on National Market System and Related Developments at the New York Stock Exchange", Nov. 20, 1978, 17 pages.
Memo To NASDAQ Level II and Level III Subscribers from John H. Hodges, Jr. regarding Commencement of Trade Reporting in NASDAQ National Market System Tier 1 Securities, dated Feb. 10, 1982, 2 pages.
Williams, Harold M., "The Securities Industry and the National Market System: A Current Perspective", News, Securities and Exchange Commision, Nov. 30, 1978, 30 pages.
Securities Week, Amr. 19, 1979, 2 pages.
Williams, Harold M., "The Securities Industry Entering the Eighties: An Economic Overview," News, Securities and Exchange Commission, Nov. 29, 1979, 32 pages.
Williams, Harold M., "The National Market System: An Update", News, Securities and Exchange Commission, Oct. 5, 1980, 46 pages.
"Why The Big Players Want A Piece of Instinet", Money & Markets Fortune, Aug. 19, 1985, p. 1.
Sporleder, Thomas L. and Davis, Ernest E., "Cattlex, A Computerized Cash and Contract Market for Feeder and Stocker Cattle, Operating Procedures and Trading Techniques", technical Report No. 813, Apr. 1981, 42 pages.
Lorie, James H., "Conjectures on the Securities Industry in 1982", Chapter II, pp. 29-39.
Merrill Lynch, Pierce, Fenner & Smith Incorporated, "Proposal For A National Market System" Oct. 16, 1975, pp. 1-37.
Peake, Junius W., "Computers, Competition and Monopoly", Mar. 25-26, 1977, 10 pages.
"SEC Clears Cincinnati Exchange to Offer First All-Electronic Stock Trading in U.S.", The Wall Street Journal, Tuesday, Apr. 11, 1978, p. 1.

Peake, Junius W., "The Regulatory Role Systems Development", Mar. 25-26, 1977, pp. 1-11.
Peake, Junius W., "Order Flow Market Making and The National Market System", Mar. 15, 1978, p. 1-8.
Peake, J.W., "The Trader and Automated Execution: Where Is It Leading, and Why?", 1983, p. 1-7.
Rees, John, "An Exclusive Interview with the Governor of the Pacific Stock Exchange", The review of the News, Dec. 19, 1979, pp. 31-46.
Peake, Junius W., "Treasury Marketable Securities Systems", Jun. 14, 1983, pp. 1-39.
Peake, Junius W., "The Investor, the Institution and the National Market System", Jan. 25, 1978, pp. 1-12.
NASD Recommendations to the SEC on Qualifications for Securites in the National Market System, to Honorable Harold M. Williams from Gordon S. Macklin, Jun. 7, 1978, pp. 8-12.
Peake, Junius W., "The "Crowd" and the National Market System", Jun. 14, 1978, 21 pages.
"International Commodities Clearing House Limited, General Regulations For Future Delivery Business and Byelaws for Options", Sep. 6, 1982, 4 pages.
Fuller, James W., et al., "Outlook for the U.S. Securities Industry 1981", vol. II, Final Report, Jun. 1977, Chapters 1-11, 414 pages.
Zyncon Corporation, "Communications Study for World Energy Exchange", Jul. 26, 1983, 21 pages.
Letter to Mr. Andrew M. Klein of the Securities and Exchange Commission from Weeden & Co, Donald E. Weeden, Oct. 20, 1978, 10 pages.
Hutchinson, A.M., "Candat Displays For Cats Terminals", Dec. 5, 1974, 6 pages.
"National Securities Trading System Review for Securities and Exchange Commission", Apr. 15, 1982, pp. 1-21.
Cleland, H., "Draft Appendix D: Outline of Method and Criteria for Evaluation of CATS as a Mechanism to Replace the TSE Trading Floor-Possible Schedule for Implementation", Jun. 3, 1976, Part I and Part II, 10 pages.
McAvoy, B.J., "Cats Pilot, General Outline for Testing CATS", Feb. 24, 1976, 3 pages.
McAvoy. B.J., "Status of CATS", May 31, 1976, 2 pages.
"CATS Project Applications Today: Trader Training, Simulated Trading, Live: Stock Trading, Evaluation: Plan and Timing" The Toronto Stock Exchang, Mar. 2, 1976, 4 pages.
Letter to Mr. George A. Fitzsimmons, Secretary, Securities and Exchange Commission, from K. Richard B. Niehoff, Jul. 24, 1979, 6 pages.
Letter to Martin L. Budd, Security and Exchange Commiesion, from Peake, Mendelson and Williams, Nov. 4, 1976, 5 pages.
"NYSE-IBM Study Years Ago Urged Dvelopment of Electronic Trading Arena", Securities Week, Nov. 22, 1976, 2 pages.
Ardron, J.M., "Current Status of CATS", Apr. 1, 1977, pp. 1-3.
Ardron, M., "CATS Status Overview", Mar. 17, 1977, pp. 1-5.
Maron, J., "CATS Activities", Dec. 2, 1977, pp. 1-5.
Letter to Harold M. Williams of Securities and Exchange Commission, from MSE Richard B. Walbert, regarding Filed Nos. S7-735, Nov. 24, 1978, pp. 1-66.
Maron, J., "CATS-Special Terms Market", Oct. 26, 1976, pp. 1-2.
McAvoy, B.J., "Proposal for Training CATS Users" Feb. 23, 1976, pp. 1-9.
Letter to Mr. Junius W. Peake from Dan W. Schneider, United States Department of Justice, Mar. 22, 1979, 5 pages.
Letter to Mr. George A. Fitzsimmons of Securities and Exchange Commision, from Securities Industry Association, regarding Development of Order Routing and Market Linage Systems, Aug. 4, 1978, pp. 1-20.
Ardon, et al., "A Planning Report for the Toronto Stock Exchange", Jun. 1969, 43 pages.
"Report to Members-TSE Project to Investigate Computer Assisted Trading", The Toronto Stock Exchange, Notice to Members No. 1827, Feb. 14, 1979, 11 pages.
Report to Mr. K. Richard B. Niehoff from Deloitte Haskins and Sells, Nov. 14, 1978, pp. 1-34.
Letter to John S. R. Shad of Securities and Exchange Commision, from the Cincinnati Stock Exchange, Dec. 31, 1981, pp. 1-3.
"CATS Service and Information Centre," The Toronto Stock Exchange, CATS Project Notice 79-3, Mar. 15, 1979, 174 pages.
Williams, Harold M., "Progress Toward The Development of a National Market System", 1979, pp. 1-250 (Part 1).
Williams, Harold M., "Progress Toward The Development of a National Market System", 1979, pp. 251-548 (Part 2).
Memo to Mr. J.R. Kimber and Mr. W.L. Somerville, from Mr. M. Ardron, regarding Planning Study fro Computer-Assisted Trading (1), Aug. 26, 1969, 4 pages.
Wall Street Letter, Nov. 7, 1983, 1 pages.
Update, INTEX Press Information, Sep. 20, 1982, 3 pages.
Brown, Sidney, "Electronic Commodities MArket to Operate Offshore", Dollar, The International Journal of American Investments, May 1982, 1 page.
O'Toole, Edward T., "Surge in Financial Futures IS Only the Beginning," Dollar, The International Journalof American Investments, May 1982, 4 pages.
"Want to Play the Market? Try Index Futures", Dollar, The International Journal of American Investments, May 1982, 1 page.
"A Glossary of Financial Futures Terms", Dollar, The International Journal of American Investments, MAy 1982, 1 page.
Mendelson, Morris,"From Butoonwood to Satellite Via Wall Street", Dec. 1977, pp. 1-34.
Commodity Futures Law Reporters, Futures Trading Act of 1982, No. 175, Jun. 7, 1982, 250 pages.
Letter to Mr. Martin L. Budd of National Market Advisory Board, from Peake, Medelson and Williams, Aug. 20, 1976, pp. 1-5.
"Automated Bond System", The New York Stock Exchange, Automated Bond System, Securities Week, Oct. 1, 1978, 4 pages.
"NYSE-IBM Study Years Ago Urged Development of Electronic Trading Arena", Security week, Nov. 22, 1976, pp. 3-4.
"Securities Pacific Links With Intex to Automatic Money Markets", Securities Week, Aug. 2, 1982, 1 page.
"Automated Trading Concept", The Banker, Apr. 1982, 1 page.
"Regulations, The International Futures Exchange (Bermuda) Ltd.", Jan. 15, 1983, 87 pages.
Batten, William M., "The ABC's of the ABS", Nov. 22, 1977, pp. 1-16.
Appleby, Spurlig & Kempe, "Bye-Laws of the International Futures Echange (Bermuda) Limited", Jul. 8, 1981, 54 pages.
Morris, John, "Bermuda Says Yes to Futures Trading", American Banker, Wednesday, Jul. 8, 1981, 1 page.
"Statement of the American Stock Exchange, Inc. Before the Joint Hearings of the House Subcommittee on Oversight and Investigation and the House Subcommittee on Consumer Protection and Finance on the Development of a National Market System", Sep. 24, 1979, 14 pages.
"The Emerging National Market System", Feb. 7, 1977, 2 pages.
"Interest rate products: Eurodollar bundles", *Chicago Mercantile Exchange*, http://www.cme.com/products/interest_rate/products_interestrate_ed _bundles.cfm, retrieved from the "WayBackMachine" at www.archive.org on Aug. 20, 2008. The archive indicates that the reference was available on Feb. 20, 2003, pp. 1-4.
Excerpt from CME's 2002 Rulebook, Chapter 5 Floor Privileges - Trading Qualifications and Practices, printed Jan. 2, 2003, pp. 10-21.

* cited by examiner

Figure 8
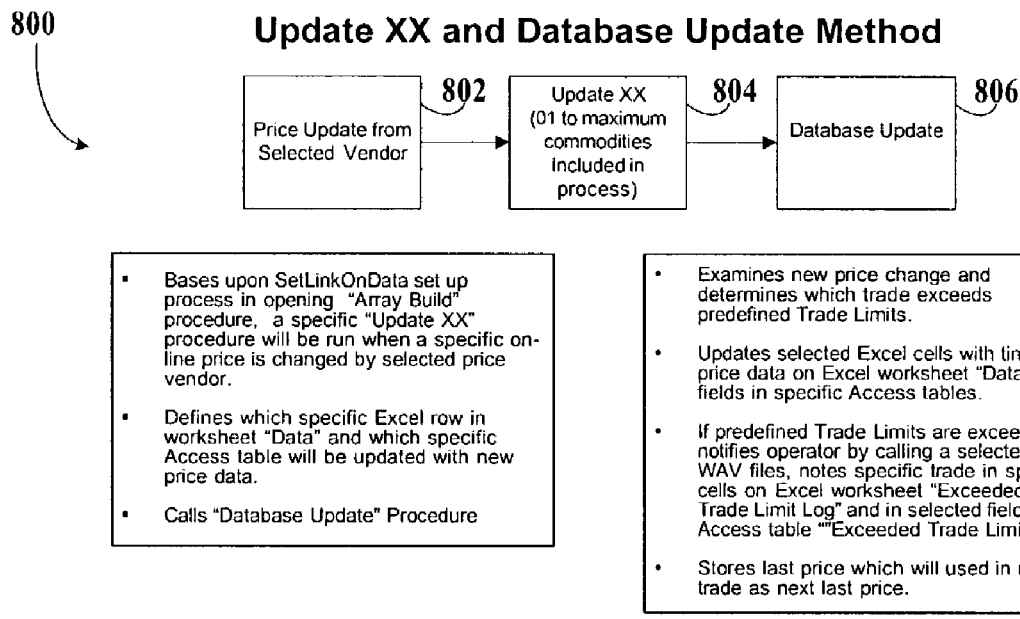
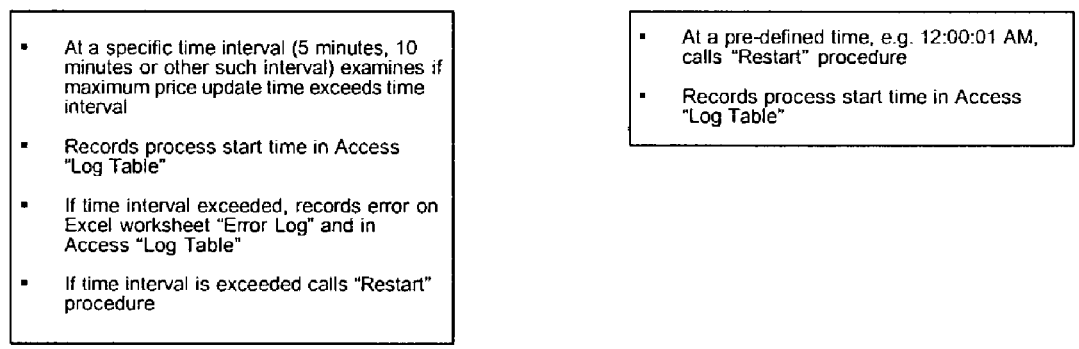

Figure 9

End of Day Method

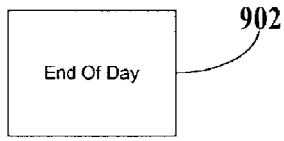
902

- Via Excel OnTime method, procedure is executed at specific time of day as a close or end of day process
- Can be called by operator by pressing a control button labeled "End of Day" in Excel worksheet "Emergency"
- Saves Excel worksheet "Exceeded Limit Log" and "Error Log" into separate Excel file.
- Closes Access database
- Set Access references to "Nothing"
- Records process start time and process results in Access "Log Table
- Saves File
- Calls following procedures:
  1. Stop On Time - act 1004
  2. Stop Time Change Timer - act 1006
  3. Clean Process - act 704
  4. Build Worksheet Data - act 706
  5. New Database File - 708
  6. Run On Time - act 710
  7. Run Time Change Timer - act 712
  8. Array Build - act 714
  9. Format Sheets - act 716
  10. Final Selected Cell - act 718

Figure 11

Restart Method

1102 Restart

- Called by following procedure:
  1. Time Check - act 810
  2. Re-Cycle Time - act 812

- Can be called by operator by pressing a control button labeled "Restart" in Excel worksheet "Emergency"

- Records process start time and process results in Access "Log Table"

- Calls following procedures:
  1. Stop On Time - act 1004
  2. Stop Time Change Timer - act 1006
  3. Clean Process - act 704
  4. Build Worksheet Data - act 706
  5. New Database File - act 708
  6. Run On Time - act 710
  7. Run Time Change Timer - act 712
  8. Array Build - act 714
  9. Format Sheets - act 716
  10. Final Selected Cell - act 718

Constant Value Method

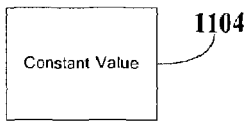
1104 Constant Value

- Declares key variables use throughout project to a constant value
- Called by "File Name"

File Name Method

1106 File Name

- Using current system date and time, arrives at a file naming convention for creating and opening Access databases and saving Excel files processed by the "End of Day" procedure - act 902

- Called by following procedures:
  1. End of Day - act 900
  2. New Database File - act 708

Figure 12

Error Method

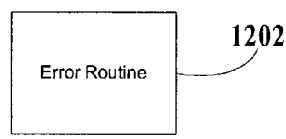

Error Routine — 1202

- Within all procedures, error detect instructions are executed. If an error is detected, the procedure assigns and error message then calls this sub-routine.
- May be called by any procedure.
- Error recorded in Excel worksheet "Log Error".
- Note: error is NOT recorded in Access "Log File" since many of the error instructions are executed at points where the Access database may not be available.
- Saves Excel File

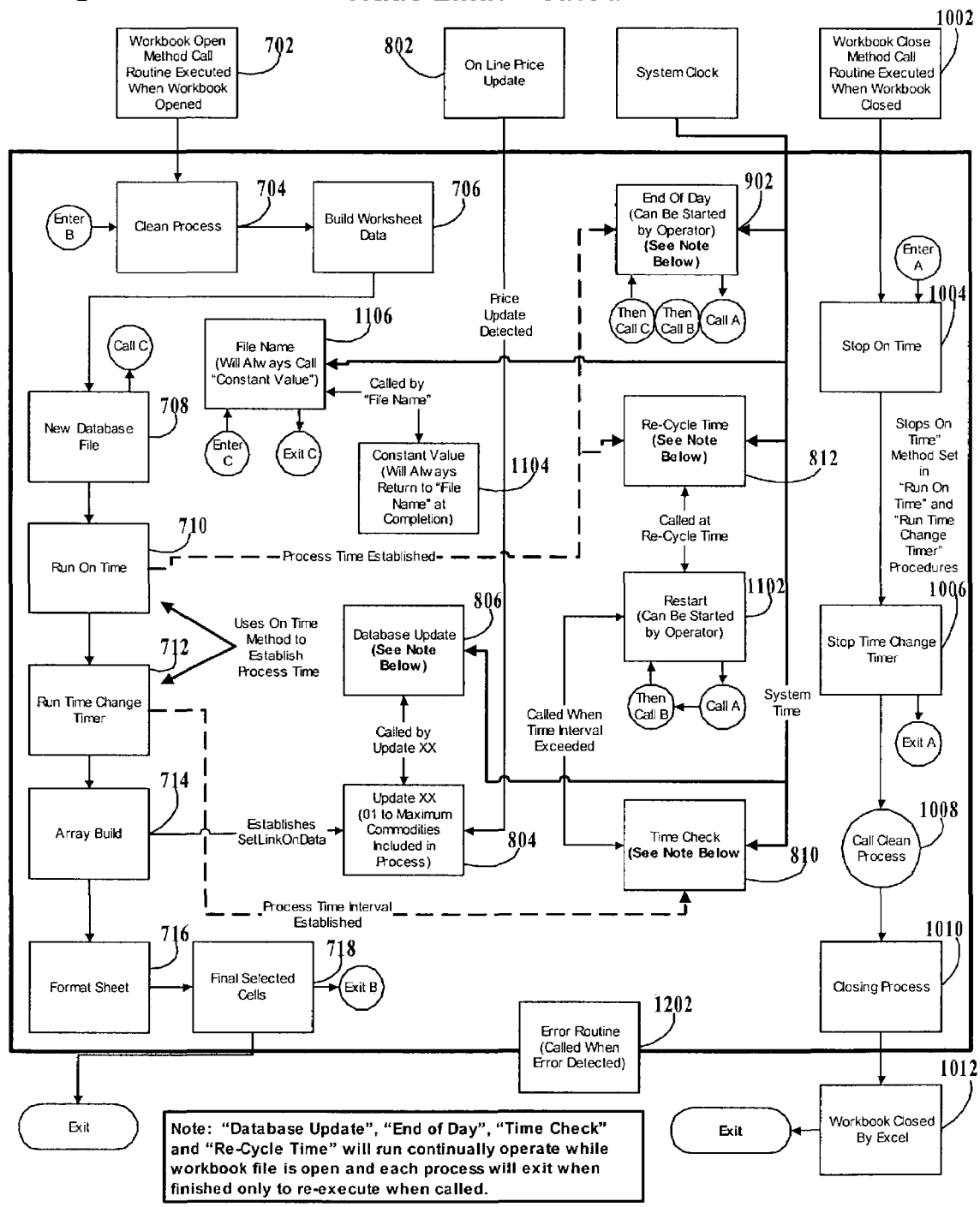

SYSTEM AND METHOD FOR MONITORING TRADES OUTSIDE OF A NO-BUST RANGE IN AN ELECTRONIC TRADING SYSTEM

FIELD OF THE INVENTION

This invention relates to a system and a method that monitor investments, and more particularly, to a system and a method that monitor trades outside of a theoretical no-bust range in an electronic trading system.

BACKGROUND

The speed and efficiency through which investments can be executed through electronic trading systems provide many benefits. In many markets, Electronic Exchanges facilitate a greater number of market participants than do other Trading Exchanges. The greater the number of market participants, the greater the market's liquidity. In liquid markets, prices are driven down by competition; prices reflect a consensus of what an investment is worth; and the trading systems provide a free and open dissemination of information.

While speed and efficiency of many electronic markets can enhance market participant's wealth, these same qualities can increase the adverse affect of a trade that is executed in error. Specifically, orders executed at prices substantially away from a market price can cause other market participants both in their markets and in related markets to make unsound decisions. In a futures market, for example, a buyer's large order executed at a price much higher than a prevailing market price can cause other sellers to substantially raise their prices, ultimately, pricing some buyers out of that market and leading to executed transactions that result in substantial losses for other buyers. In futures markets these errors can induce buyers and sellers in that market, in a related derivative market, and/or in an underlying cash market to make unsound decisions. The harmful effect of an erroneous trade can extend well beyond the market participants of that trade by affecting the integrity of the entire market and other markets. Furthermore, undetected erroneous trades may have a lasting impact on historical price information and various technical charting strategies used by market participants.

To mitigate these harmful effects, some Exchanges have adopted policies and procedures that, in appropriate cases, permit the cancellation of a clearly erroneous trade. Some of these Exchanges attempt a prompt resolution of a trade error by establishing a narrow timeframe within which a party may request that a trade be cancelled. To assure that only erroneous trades that may significantly affect other market participants are the only trades subject to cancellation, some Exchanges adopted a "no-bust range." In a "no-bust range," erroneous trades executed within a price range may not be subject to cancellation, even if executed in error to avoid penalizing the innocent traders that lack notice. Unfortunately, the "no-bust range" can be susceptible to subjectivity as Exchanges are not always able to define an "erroneous price."

Although many policies and procedures are intended to enhance the integrity of markets, some are not agile enough to respond to the many errors that an Electronic Exchange encounters. The increasing use of automated arbitrage systems, for example, allow some market participants to benefit from erroneous prices. Such failures penalize counterparties to those trades, and create risk and uncertainty by artificially influencing the value of those trades. Some approaches do not scale well to large networks, new products, or the large volatility that occurs in those markets that trade popular contracts. These approaches can require repeated modifications that increase price instability and distort price discovery.

SUMMARY

The present invention is defined by the following claims. This description summarizes some aspects of the present embodiments and should not be used to limit the claims.

An alert system embodiment for notifying an Exchange staff of a trade that appears to be outside of an expected market range of prices comprises an input device, determination logic, and evaluation logic. The input device provides data used to generate a theoretical no-bust range of prices. The determination logic derives the theoretical no-bust range of prices within which an erroneous trade cannot be cancelled. The evaluation logic monitors trades matched through an electronic matching system and compares those trades to the theoretical no-bust range of prices. The alert logic provides a notification when the evaluation logic identifies a potentially erroneous trade that lies outside of the theoretical no-bust range of prices.

A method of notifying an Exchange of a trade that potentially lies outside of the expected range of prices comprises monitoring an input range of prices; deriving a theoretical no-bust range of prices; monitoring transactions executed by an automated matching system; comparing the prices of the transactions to the theoretical no-bust range of prices to determine if a potentially erroneous trade can be cancelled; and notifying an Exchange when one or more of the prices of a transaction lies outside of the theoretical no-bust range of prices.

Further aspects and advantages of the invention are described below in conjunction with the present embodiments.

BRIEF DESCRIPTION OF THE DRAWINGS

FIG. 8 are flow diagrams of trade limit operational methods.

FIG. 9 is a continuation of the trade limit operational methods of FIG. 8.

FIG. 11 are flow diagrams of a trade limit restart, a constant value, and file name methods.

FIG. 12 is a flow diagram of an error routine method.

FIG. 13 is a flow diagram of a trade limit method.

DETAILED DESCRIPTION OF THE PRESENT EMBODIMENTS

The present embodiments of the system and method provide Exchanges and users with a flexible approach and structure that minimize the harmful effects of selected trades executed in error. While the present embodiments are not used to rectify all market errors, the system and method can intervene by automatically identifying a trade that would appear to be outside of an expected, a predicted, or a prevailing market range of prices. A price that is not consistent with the history of a contract, is not consistent with the history of an underlying commodity, is not consistent with the price of a highly correlated investment, or is not consistent with, or bears no relationship to, a fair market value may be identified. In some embodiments, a program may analyze trades. Because some market participants are not always aware of trades they execute in error, some embodiments identify errors before market participants discover them.

Figure 1:
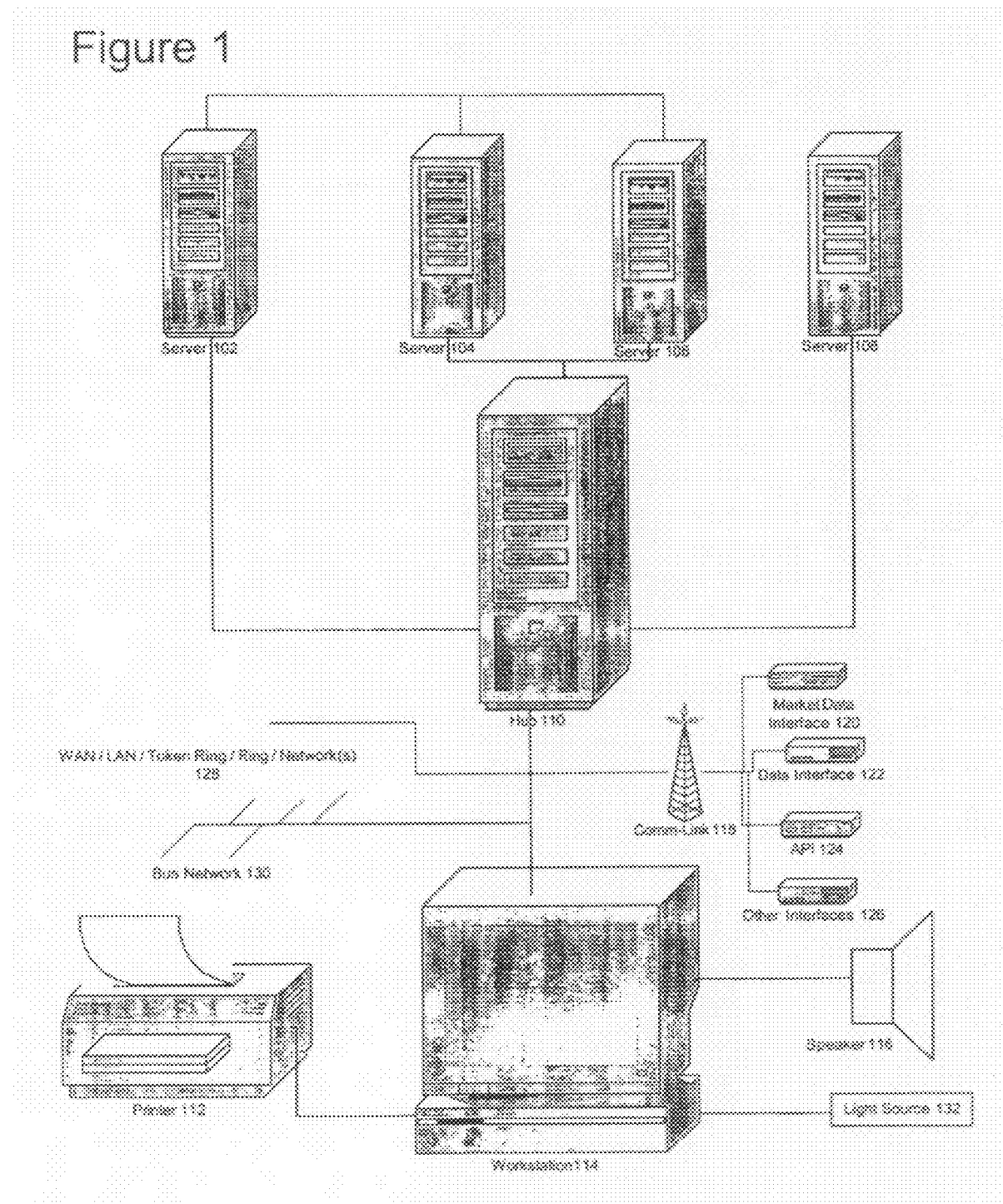
FIG. 1 is a system view of an alert embodiment.

FIG. 1 is a system diagram of a present alert embodiment. FIG. 1 illustrates a hub-and-spoke relationship, wherein each resource, application, or order flows through a single entity (e.g., the hub 110) before being received by servers 102-108. In this embodiment, the hub 110 and the servers 102-108 can each comprise a single server or a server cluster that comprise a group of independent computers that work together as a single system but present the appearance of a single server to one or more clients. In FIG. 1, the clients are illustrated as a workstation 114, interfaces 120-126, and one or more networks such as a wide area network ("WAN"), a local area network ("LAN"), a ring network, a token ring network, a bus network, 128 and 130, etc. Other peripheral devices can be coupled to the workstation 114, such as a printer 112, a speaker 116, a light source 132, and/or any other device that converts electrical signals into sound, light, and/or tactile forces that are perceptible to the sense of touch, etc.

Preferably, the hub 110 comprises a management server. Preferably, the management server electronically receives, converts, and transfers data in a form compatible with protocols used by the servers 102-108, the workstation 114, the communication link 118, the interfaces 120-126, and the networks 128 and 130. The interfaces can include an application programming interface (an "API") 124, a data interface 122, a market data interface 120, and/or other interfaces 126, for example. Preferably, the market data interface 120 provides quote vendors with access to selected output disseminated from the hub 110.

In this embodiment, the hub 110 also provides routing control to a trade matching system, such as an automated trading engine shown as servers 104 and 106. When orders are matched automatically by a matching algorithm or system within one or both of the servers 104 and/or 106, preferably the details of the trade and information of interest to the market are returned to a trade evaluation system, the quote vendors, and the trade participants. Preferably, the trade participants include the buyers and the sellers.

Preferably, the trade evaluation system, shown as a server 102 in FIG. 1, interfaces the hub 110. In one embodiment, the trade evaluation system includes a first processor or determination logic that interprets and assesses pricing data, a memory that stores and retrieves data, and evaluation logic that can comprises a second processor or relies on the computing power of the first processor. Preferably, the evaluation logic is suitable for calculating a discrete variable that represents a synthetic or theoretical market price and an interval that extends above and below the synthetic market price. Preferably, the interval or theoretical no-bust range is fixed within a number of ticks above and below the synthetic market price and can differ with each contract.

When the present system and method is used in a futures Exchange, the theoretical no-bust range comprises a price interval within which transactions that fall within that interval are not subject to cancellation by the Exchange. Preferably, trades that fall within the theoretical no-bust range do not have a significant adverse effect on the market, and therefore, the trade stands in the Exchange even in error. Certainly, in some embodiments and Exchanges, trades that fall within the theoretical no-bust range can be cancelled by agreement between the market participants, but that can require all market participants to that trade to reach agreement. In other embodiments and Exchanges, the trades that fall within the theoretical no-bust range cannot be cancelled by agreement.

Preferably, the other interfaces 126, the APIs 124, the market data interfaces 122, the data interfaces 122, the networks 128 and 130. etc., provide market participants, quote vendors, and others with real and/or delayed time access to trade data. The trade data can include investment prices such as futures contract prices, settlement prices, bids, offers, and other Exchange related or derived information. In some embodiments, inter-process communication methods, such as a Dynamic Data Exchange ("DDE") and/or an Object Linking and Embedding ("OLE") are used to exchange data and commands between two or more servers or applications that are running simultaneously.

Figure 2:
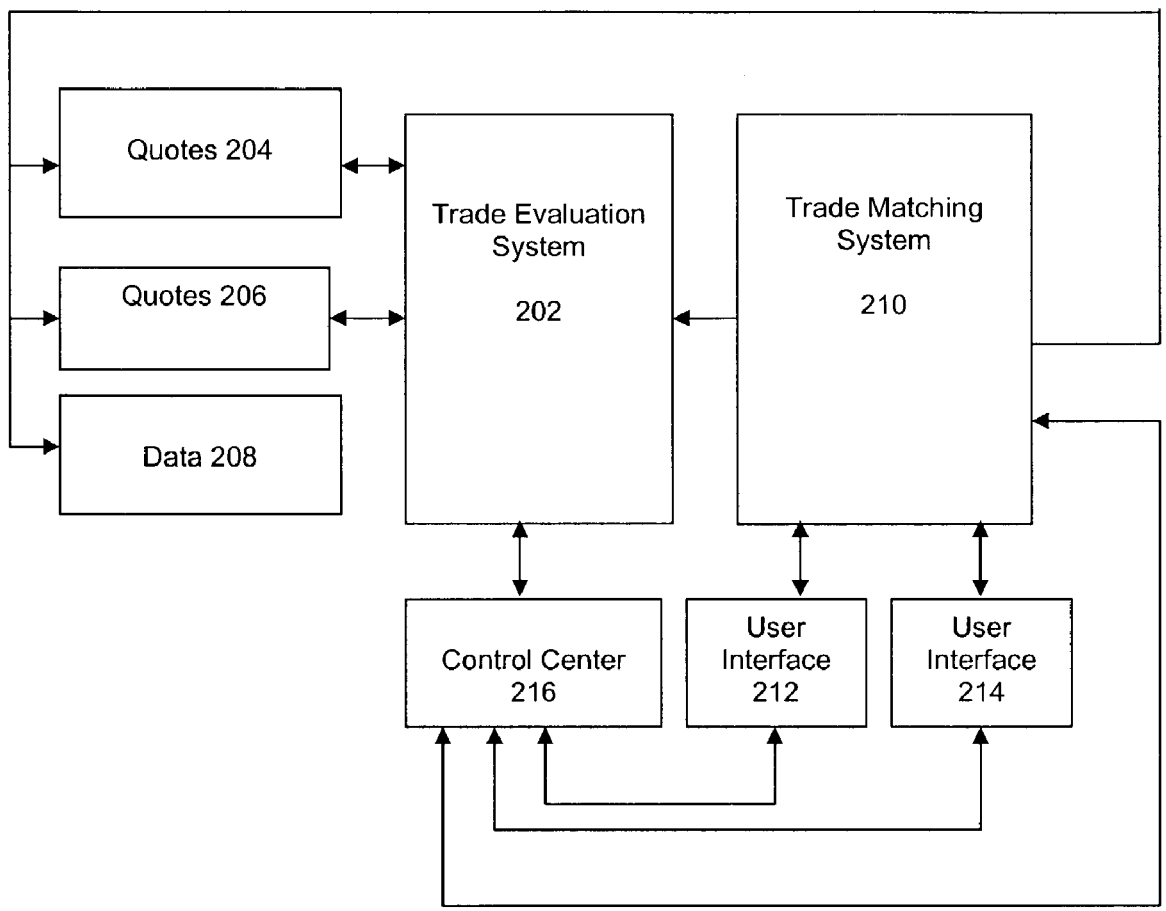
FIG. 2 is a second system view of an alternative alert embodiment.

As shown in FIG. 2, the alert embodiment includes input devices 204-208, a trade evaluation system 202, user interfaces 212 and 214, and a control center 216. Preferably, the input devices include devices that provide quotes 204 and 206 and other data 208 to the trade evaluation system 202. Such data can include separate, bid, offer, and trade prices, the daily cash settlement prices, pre-defined and/or monthly moving averages, etc. Other Exchange data can include the official high bid and low offer prices for contract through a variable or defined interval, real-time or delayed option volatilities, moving average settlement prices, open interest data, provisional and final exchange rates, position reports, etc. Preferably, the quote and data devices 204-208 provide the data that the trade evaluation system 202 needs to generate a synthetic market price. Preferably, the synthetic market price reflects a calculated worth or a consensus value of a commodity or another financial instrument at predetermined times in the past or future.

Preferably, the trade evaluation system 202 derives a synthetic market price and theoretical no-bust ranges through a sequence of steps. These steps can vary by the types of instruments (e.g., product, service, etc.), the types of commodities (a long list of products that includes financial instruments and currency), the markets, the pricing of related products, the histories of the commodity, and/or other circumstances or data surrounding or related to a contract or an investment.

In this embodiment, the cash market, which is the actual or spot market, is where the commodities themselves are bought and sold. The cash price is the actual price of the physical commodity; a futures price is the price of a contract in a futures market. Although cash and futures prices are not the same, in some instances the prices have a tendency to parallel each other. As the expiration date of a futures contract approaches, for example, preferably the separation between the two prices, the basis, converge. Because of this strong relationship in prices, in some instances, the trade evaluation system 202 can execute a correlation analysis to predict a forward or a regressive synthetic market price and a theoretical no-bust range in the futures market based on the cash market prices.

Similarly, a strong relationship can exist between commodities traded in an automatic matching system and the commodities traded in a physical exchange. At the Chicago Mercantile Exchange ("CME"), for example, futures trading of the Standard and Poor's 500 Stock Price Index ("S&P 500®"), are sold by contract in the trading pits through live, open outcry trading. A smaller version of this contract, the E-mini Standard and Poor's 500 futures ("E-mini S&P 500®") is sold electronically through the Chicago Mercantile Exchange's ("CME's") GLOBEX® trading system. Due to the relatively high correlation between these two markets, in some instance, the trade evaluation system 202 can also execute a correlation analysis or use inference logic to predict a forward or a regressive futures price and/or a theoretical no bust range of the E-mini S&P 500® based on the S&P 500® futures traded in the pits. In this instance, historical prices tracked from the trading floor can be used to determine the synthetic market price and a theoretical no-bust range for a contact traded in an automated Exchange.

Similarly, highly correlated products traded separately or in a common venue can also be used by the trade evaluation system 202 to predict the market price of a commodity at a time in the future or the past. For instance, the E-mini NASDAQ-100® traded at the Chicago Mercantile Exchange ("CME"), which is about one fifth of the size of the NASDAQ Index ("National Association of Securities Dealers Automated Quotation System Index"), can also be used to predict a forward and/or a regressive futures price and a theoretical no-bust range for another index. If a strong relationship exists between the E-mini NASDAQ-100® and an illiquid equity stock index, for example, the trade evaluation system 202 can use inference logic or a prediction algorithm to predict a forward or a regressive synthetic price and a theoretical no-bust range for the illiquid equity stock index without relying on a prevailing market price that may not reflect the actual state of the marketplace.

As shown in FIG. 2, the trade matching system 210 couples the user interfaces 212 and 214 to the trade evaluation system 202. Preferably, the trade matching system uses one or more matching algorithms, such as a "first in, first out" ("FIFO"), an allocation algorithm, a hybrid price/time priority, such as a Lead Market Maker ("LMM"), etc., for example, to automatically match orders. Once the details of the orders are entered through the user interfaces 212 and 214, preferably, the trade matching system 210 executes the trade and transmits matched trade data (e.g., instrument type, the price, the quantity, the buyer, the seller, etc.) to the trade evaluation system 202 and user interfaces 212 and 214. The trade matching system 210 also transmits matched trade data and quote data to the quote and data vendors 204-208. Preferably, the matched trade data and quote data describe the most recent movements of the markets.

Through the Control Center 216, preferably the Exchange or members of the Exchange oversee the cancellation of potential trading errors. Preferably, the identification of a potential erroneous trade occurs in a narrow time fame as does the Exchange's or member's decision whether to cancel such a trade. To assure that market participants are aware that an erroneous trade may be cancelled, preferably, the trade evaluation system 202 provides a prompt notice to the user interfaces 212 and 214, the control center 216, and any independent communication systems. In some instances, the embodiment of FIG. 2 provides automatic notices only to the control center 216, allowing the Exchange to notify market participants of such a trade through a messaging system.

Because market participants may not be aware that an erroneous trade occurred due to the large volume of messages sent over an electronic trading system or because the market participants are no longer trading, the present system and method also can encompass independent communication systems that are coupled to the trade evaluation system 202 to convey warnings/alerts that a trade may be cancelled. Such systems can include devices that send and/or receive messages via telecommunication or wireless links such as portable phones, personal digital assistants ("PDAs"), and/or electronic mail devices, devices that send and/or receive images and can print them on a tangible media such as faxes, etc. Preferably, these systems make market participants aware of a possible erroneous trade in a narrow timeframe.

Once a potential erroneous trade has been identified and been found to have been traded outside of the theoretical no-bust range, the trade evaluation system 202 alerts the control center 216. Preferably, the control center 216 attempts to resolve the error through the Exchange's policies and procedures. At the Chicago Mercantile Exchange ("CME"), for example, if all parties to a trade agree to cancel a trade, and no third party notifies the GLOBEX® Control Center within a narrow timeframe, the trade will be cancelled by the GLOBEX® Control Center. If a party to the trade cannot be contacted or does not agree to cancel a trade, the GLOBEX® Control Center will initiate an investigation, examine the underlying circumstances of the trade, and make a decision whether to cancel the trade. If the erroneous trade is cancelled, the GLOBEX® Control Center can then consider canceling contingent and other orders executed as a result of the erroneous trade.

Figure 3:
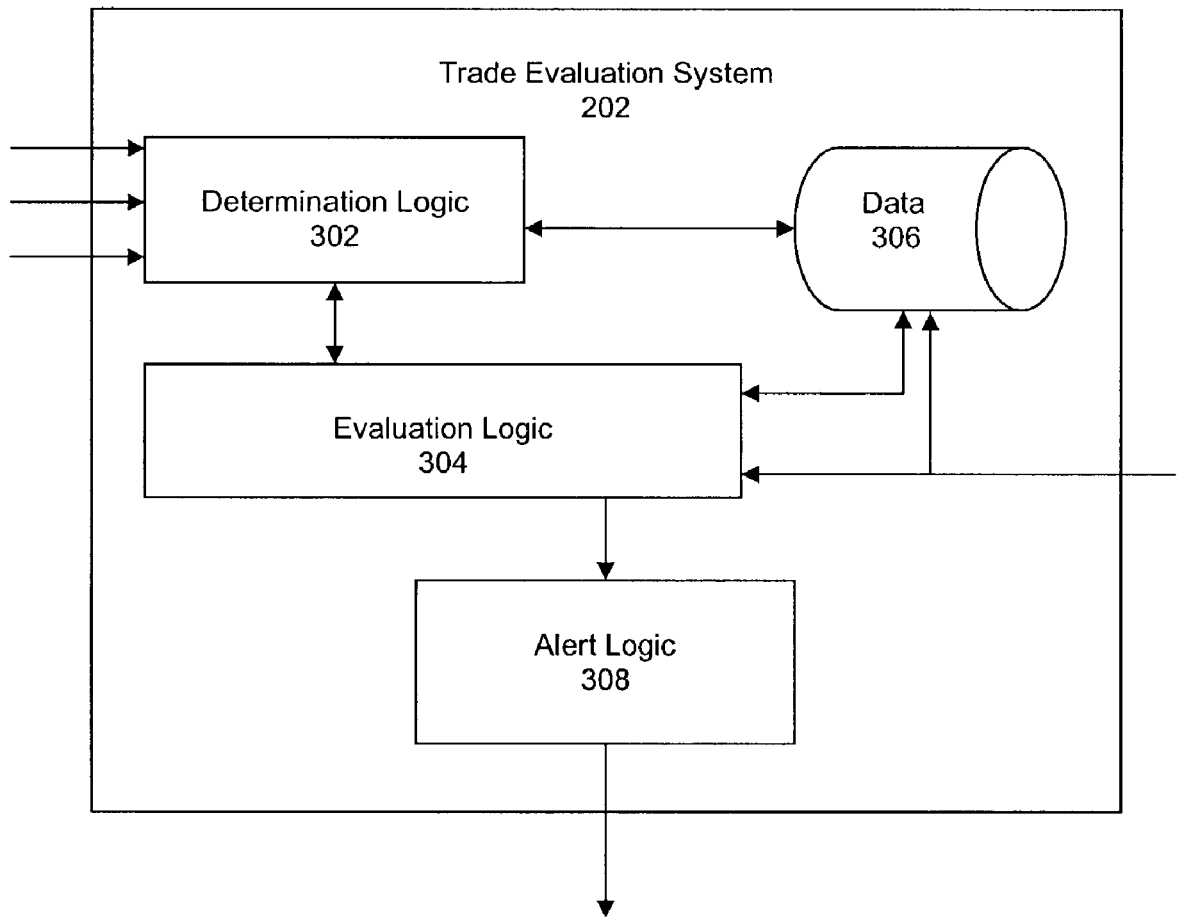
FIG. 3 is a system view of a trade evaluation system of FIG. 2.

Preferably, the system and method automatically identifies a potential erroneous trade through the trade evaluation system 202. One embodiment of the trade evaluation system 202 is shown in FIG. 3. In this embodiment, the trade evaluation system 202 includes determination logic 302 that can comprise a first processor that interprets and assesses pricing data, memory 306 resident to or separate from the determination logic 302 that stores data for retrieval, and evaluation logic 304 that can comprise a second processor or relies on the computing power of the determination logic 302. Preferably, the evaluation logic 304 is suitable for calculating a synthetic market price and an interval that extends above and below the synthetic market price. Preferably, the interval or theoretical no-bust range is fixed within a number of ticks above and below the synthetic market price but can differ with each contract.

Preferably, the determination logic 302 determines or calculates the synthetic market price based at least in part upon the data provided by the quote 204 and 206 and/or the data devices 208. When the data is received by the trade evaluation system 202 some of it is processed by the determination logic 302 and can be stored in a non-volatile or volatile memory 306. Preferably, the determination logic 302 calculates the synthetic market prices and theoretical no-bust ranges upon demand, in delayed-time, or in real-time as an investment ticks, meaning as a price moves. Preferably the synthetic market prices, and in some embodiments, the theoretical no-bust ranges are stored in memory 306. By storing one or both of these values, the present system and method can recreate a theoretical market in a substantially narrow time frame. The storage of one or both of these values can preserve market integrity by minimizing the possibility of canceling a trade well after it has been executed.

Preferably, the evaluation logic 304 compares the trade prices received from the trade matching system 210 to the synthesized no-bust range. While in some embodiments price comparisons can occur in delayed or batch time, preferably, the comparison occurs in real-time which is within a narrow time period after a trade has occurred. If the price of the trade is within the theoretical no-bust range, the trade will stand and no further action will be taken. If the price of the trade falls outside of the theoretical no-bust range, preferably, the evaluation logic 304 enables the alert logic 308. In this embodiment, the alert logic 308 can comprise a third processor or can rely on the computing power of the evaluation logic 304 and/or the determination logic 302.

Once a potential erroneous trade has been found to lie outside of the theoretical no-bust range, preferably the alert logic 308 enables an alarm in the control center 216. In alternative embodiments, the alarm also can be used to notify market participants. In one embodiment, different alarms are used to indicate different events. In a first mode, the type, or the frequency, or the loudness of a sound, or the brightness, or the frequency (e.g., a strobe), or the color of a visual alarm, or the frequency, or the intensity of a tactile pressure (e.g., a vibration) or other indicia (collectively and individually referred to as a "warning" hereinafter) may identify the data source or the type of data used to predict the synthetic market price and/or the theoretical no-bust range. For instance, a warning may identify a potential erroneous trade that lies outside the theoretical no-bust range when the no-bust range is based on electronic Exchange data. A second warning may indicate that the theoretical no-bust range was based on electronic exchange and live, open outcry trading data. A third warning may indicate that the theoretical no-bust range was based on the actual cash or spot market.

In a second mode, the warning may identify the product that was traded. In a futures market, for example, different products may generate different warnings. If the present embodiment were used at the Chicago Mercantile Exchange ("CME"), for example, a first warning may identify potential erroneous trades of the E-mini S&P 500®, a second or different warning may identify a potential erroneous trade of the E-mini NASDAQ-100®, and a third or different warning may identify a potential erroneous trade of another product, etc.

In a third mode, the warning may indicate the degree of separation between the price of a potential erroneous trade and the theoretical no-bust range or the synthesized market price. In an audible embodiment, for example, the intensity or frequency of the sound may indicate the degree of separation between the price of the potential erroneous trade and the theoretical no-bust range. Many other alternative embodiments are also possible. For instance, the intensity or frequency of a warning may indicate the level of experience of a market participant (e.g., a new market participant may have a louder or a brighter or a more powerful warning); the intensity or frequency of the warning may indicate the frequency that a market participant submits orders in error, executes erroneous trades, cancels trades, or distinguishes a market participant in any other way. In alternative embodiments, any combination or variation of warnings/alerts from the first, second, and third modes are used.

Figure 4:
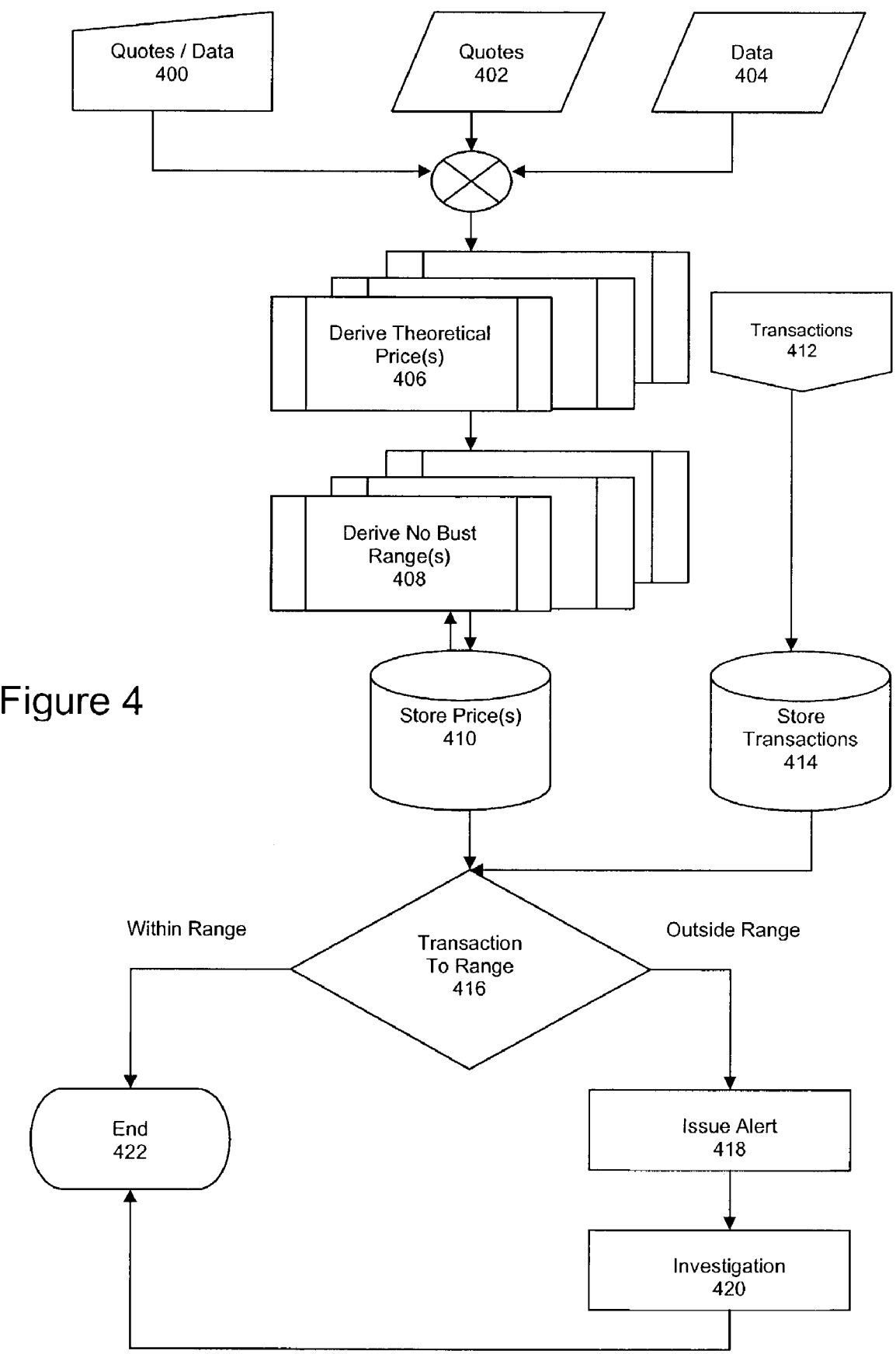
FIG. 4 is a flow diagram of an embodiment of an alert method.

As shown in FIG. 4, the present alert method begins detecting potential erroneous trades at acts 400-404. At acts 400-404 the present alert method receives quotes and data manually or automatically. At acts, 402 and 404 the alert method receives real-time and/or delayed-time market information from an Exchange or an on-line data service or a data provider, or etc. Preferably, a communication method or technology is used that allows multiple programs that are running separately to simultaneously exchange data and commands. At act 406, a correlation analysis, inference logic, and/or a prediction algorithm are used to predict a forward and/or regressive synthetic market price based at least in part on data received from one or more of the Exchange, an on-line data service, a manual data service, or another data provider. As shown by the multiple process boxes, one or more processes can be used to derive a forward and/or regressive synthetic market price. When more than one process is used, multiple synthetic market prices can be used to determine one or more theoretical no-bust ranges.

At act 408, the theoretical no-bust ranges are derived. Preferably, one or more theoretical no-bust range are used to determine if a warning should issue. While the theoretical no-bust range is a fixed number of ticks above or below the synthetic market prices in the present embodiment, in alternative embodiments the range comprises a fluid range that can vary within or by the market. In one embodiment, the upper and lower limits of the theoretical no bust range are symmetrical about the synthetic market price; in another embodiment, the separation between the upper and lower limits of the theoretical no-bust range to the synthetic market price are not equal.

At act 410, a memory stores one or more synthetic market prices, variance(s) used to predict the theoretical no-bust range(s), and the no-bust range(s). Because requests to cancel a trade can also be made to the Exchange well after the trade is executed, by storing one or more of these values, the present method can re-create the theoretical no-bust range, and preferably allow the Exchange to reach a decision whether to cancel a trade in a narrow time frame.

At act 414, the memory stores the details of the potentially erroneous trade that are received automatically from the trade matching system 210 or through a request to cancel a trade made by a market participant at act 412. Preferably, the details of the potentially erroneous trade facilitate the decision making process. In this embodiment, those details are in a protocol or can be converted to a protocol that allows the trade evaluation system 202 to determine if the potential erroneous trade lies outside the theoretical no-bust range at act 416.

If the trade evaluation system 202 determines that the price of the potentially erroneous trade lies outside the theoretical no-bust range, the trade evaluation system issues a warning to the control center 216 at act 418, and in some embodiments, to the markets to assure that market participants are aware that a potentially erroneous trade may be cancelled. Because not all market participants may have access to messages sent over the Exchange, alternative methods encompass communication systems that can forward alerts to market participants.

If an investigation is needed, at act 420, the Exchange or an automated system initiates an investigation to determine if the trade should be cancelled. An investigation may be needed if, for example, a party to a trade cannot be contacted, or does not agree to the cancellation of an order, or a third party objects to the cancellation of a trade. In those instances, the Exchange or the automated system, such as an expert system, will analyze the underlying circumstances of the trade and decide whether to cancel it.

If the price of a transaction lies within the theoretical no-bust range at act 416; or, when a decision whether to cancel a trade is reached, the present method ends at act 422. If the trade is to be cancelled, in one futures embodiment, the trade is taken out of the price stream, market participants are notified, and preferably the trade is also cancelled in the Exchange's clearinghouse.

Figure 5:
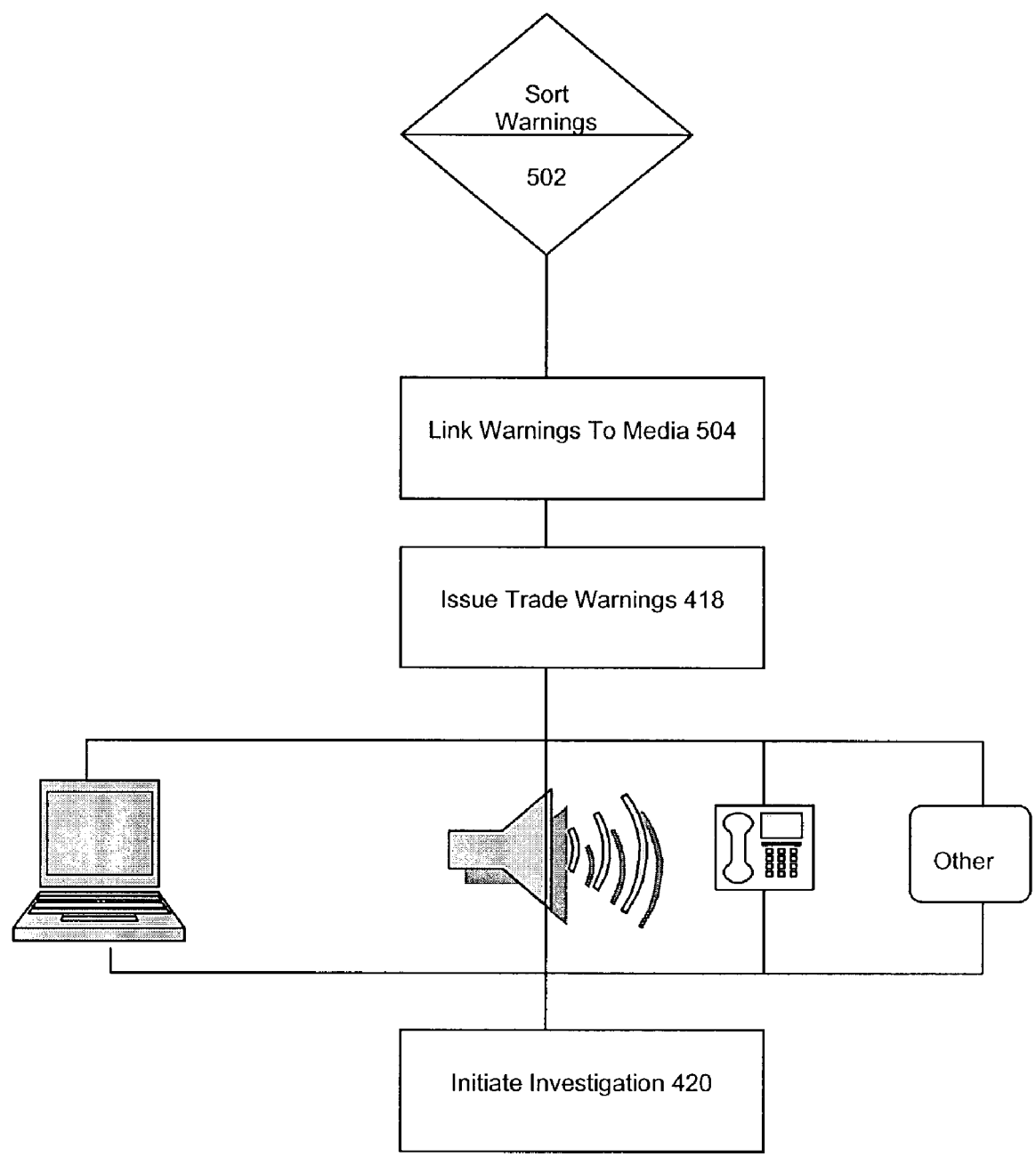
FIG. 5 is a continuation of the flow diagram of FIG. 4 illustrating additional optional acts.

In those alternative methods using multiple media types to make the control center 216 and/or the market participants aware that a trade may be cancelled, some alternative embodiments sort the warnings once the trade evaluation system 202 determines that the potential erroneous trade lies outside of the theoretical no-bust range as shown in FIG. 5.

Once the warnings are sorted at act 502, preferably the warnings are linked to a media at act 504. Preferably, at act 418, the warnings issue. Independent communication systems may forward the warnings to the market participants using any communication method or system, including a computer, a speaker, a telephone, or another device. Upon the issuance of the notice, preferably, an investigation is commenced at act 420.

Figure 6:
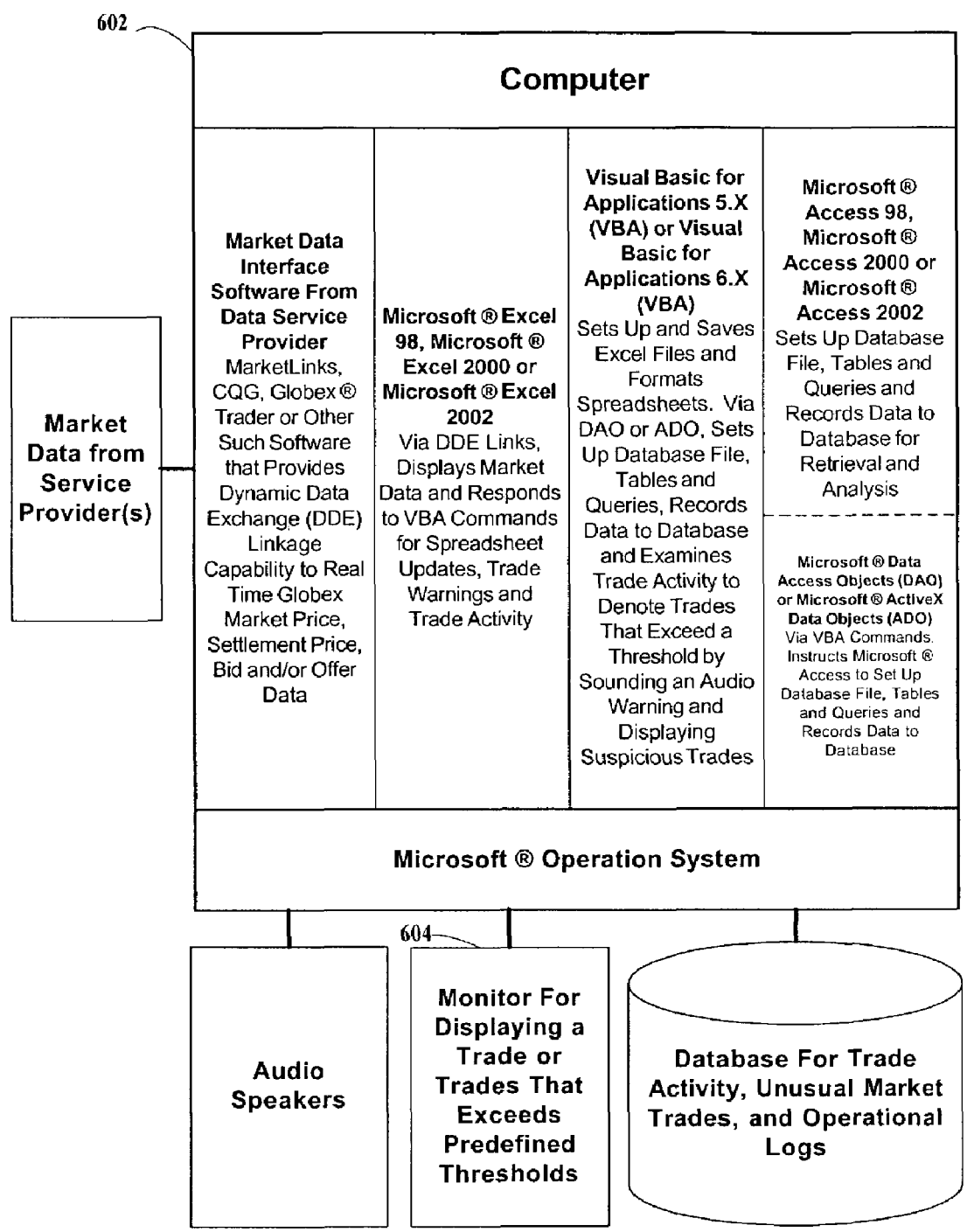
FIG. 6 is a functional diagram of an alternative alert embodiment.

FIG. 6 is a functional diagram of an alternative alert embodiment. FIG. 6 illustrates a computer 602 in a hub-and-spoke relationship, wherein details of trades, information of interest to the market, and price, time, trade activity, flows through a single entity, the computer 602 before the computer 602 issues alerts or displays trades that exceed theoretical thresholds on a monitor 604. In this embodiment, the applications shown within the computer 602 can be server-based applications that comprise a program stored on a network that can be used by more than one client machine at a time. While specific sources of software and data sources are shown in FIGS. 6-12, the embodiments encompasses other software, data, and sources. Preferably, the software can organize data through relationships or formulas, store information to facilitate searches, and in some embodiments, execute programs.

Figure 7:
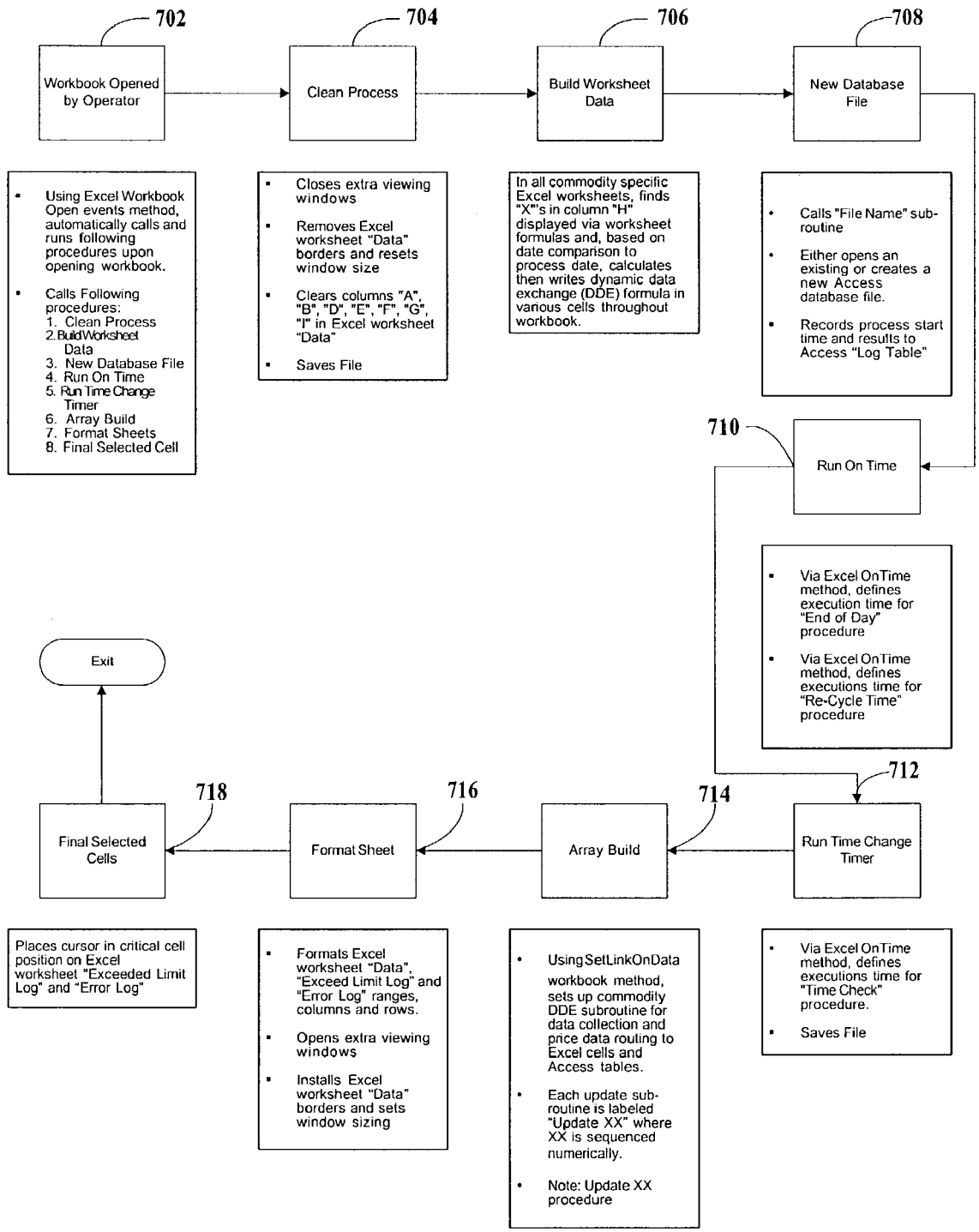
FIG. 7 is a flow diagram of a trade limit opening method.

As shown in FIG. 7, a present trade limit opening method can be used to generate an application used to monitor trades and organize data using various spreadsheet cells and database fields. Preferably, formulas can establish relationships between selected cells, and in databases, fields.

At act 702, the present trade opening method opens a file containing a number of related worksheets (a/k/a "a workbook"). Upon its opening, the present trade opening method calls and runs the routines shown in acts 704-718.

At act 704, the cleaning method commences. Preferably, the present trade opening method closes any extra viewing windows, removes any data boarders, and resets window sizes. Preferably, the method then clears the columns and rows that comprise the worksheet(s), and saves the worksheet (s) in a memory.

At act 706, an array building method identifies the initial month of a contract and builds an array based on that initial month. In a futures Exchange, commodity contracts open and close at different time throughout the year. Based on date comparisons, act 706 synthesizes the contract dates through interprocess communication formulas such as Dynamic Data Exchange ("DDE") formulas programmed within the cells of the worksheet.

At act 708, a database management system opens an existing file or creates a new file. Preferably, the database management system stores information in tables and can conduct searches on data stored in rows and columns. Preferably, a record of transactions or activities, such as a "Log Table," is maintained in the existing or new file.

The present trade opening method continues by defining the end of day and a re-cycle time method at optional act 710. If an Exchange elects to define these parameters, the Exchange enters a time that closes out the monitoring method and a time to re-install the method. When operational, the re-cycle time establishes times or launches a timer that re-starts the opening procedure at a measured time interval. In some embodiments, a re-cycle time can be used to overcome a bug or a deficiency in software that causes the software to stall in a wait state, runs for extended periods of times, or fail for another reason. In other embodiments, the re-cycle time can build an archive in programmed increments.

At act 714, the present trade opening method performs an update. When an input disseminates a new price or a change in price for a specific commodity, for example, the array build act analyzes the new price change to determine if the price lies outside of a theoretical no-bust range. If the trade limits of the theoretical no bust range are exceeded, a warning issues and details of the trade, such as a time, price, and trader identities are recorded in the appropriate cell(s) within a worksheet log and/or in one or more selected fields of a database log.

When the details of the trade are recorded in the worksheet and/or the database log, preferably the present trade opening method formats the data, sets the window size, and opens the appropriate window. In the present embodiment, the details of the trade are recorded in files entitled "Exceed Limit Log" and "Error Log."

At optional act 718, a cursor is placed in one of the cells or fields that exceeded the theoretical no-bust range. Thus, when used in a Futures Exchange, the present opening method identified the commodities being traded, the contract dates, price changes, and made comparisons to a theoretical no-bust range, and when prices lied outside the theoretical no-bust range, issued warnings. Potentially erroneous trades were flagged in a tangible and/or a digital media.

In the present trade opening method, the operational method continues until the method ends by closing a file. Preferably, the price updates occur when there is movement in the market, meaning when there is a change in an on-line price. In this embodiment, details of the array build act are further described by the acts of FIG. 8.

When a price update is received from a quote or data vendor at act 802, preferably the update method 800 examines the new price to determine if that price exceeds the theoretical no-bust range. Preferably, the price updates selected price and time data in the worksheet cells and/or the database fields at act 804. If the theoretical no-bust range is exceeded, preferably an Exchange control center is notified by a warning. In an audio embodiment, for example, the array building act issues a warning by selecting an audio file such as a "WAV" file. A "WAV" file is a file format used in a windows operating environment that stores sound. Preferably, the update method 800 updates the "Exceed Trade Limit Logs" with details of the possible erroneous trade in worksheet cells and/or database fields at act 806. Preferably, the update method is coordinated to a time. Preferably, the time is a precise timekeeping signal, such as a clock signal that the present method receives from an atomic clock.

As further shown in FIG. 8, a system time input or time check at act 810 can be used to re-calculate a synthetic market price and a theoretical no-bust range at pre-determined intervals. In the illustrated method, the synthetic market price and a theoretical no-bust range is calculated in a five or ten minute interval. Preferably, the time is recorded in a database log that can be used in self-diagnostic routines. For example, if the exemplary time check act 810 does not poll an external timing source at an expected interval, the time check act 810 can record the error in worksheet cells and/or database fields. Once recorded, the time check act 810 can re-start the trade limit opening method by calling a re-start method shown in FIG. 11.

Preferably, the recycle time operational act 812 shown in FIG. 8 can also restart the trade limit opening method by calling the re-start method act 1102 of FIG. 11. When operational, the re-cycle time act 812 establishes a time or launches a timer that re-starts the opening method. In the illustrated embodiment, a re-start is programmed to occur at the exemplary Exchange defined time of one second past midnight. Preferably, the trade limit opening method records the restart time in a worksheet cell and/or database field.

The present trade opening method preferably ends automatically or upon demand. An unexpected occurrence or situation, for example, may require an operator to call an "end of the trading day" through a manual or software actuated means (e.g., a push button, switch, etc.). If the end of the trading day is called by an operator, occurs because of the natural close of the trading day, or occurs for any other reason, the end of day act 902 shown in FIG. 9 saves the log sheet in a memory.

In the illustrated embodiment, the "Exceed Limit Log" and the "Error Log" are saved in a memory. Preferably, the "Exceed Limit Log" includes the details of the potentially erroneous trades identified by the trade opening method; while the "Error Log" records the performance of the trade opening method. If there is a deficiency in the functionality of the acts or the program that can be in response to an unforeseen operating condition, for example, a record of those activities are preferably recorded within the "Error Log." Preferably, the end of day process shown in FIG. 9 launches the methods shown in acts 1004 and 1006 of FIG. 10 and acts 704-718 of FIG. 7. Once the files are saved, acts 1004 and 1006 of the trade closing method are executed before launching the trade opening method acts 704-718 shown in FIG. 7.

When the trade opening method is to be closed at act 1002, preferably the trade closing method launches the routines shown in acts 1004-1012. At act 1004, the present trade closing method begins. Preferably, the trade closing method reset the timers or programs used to define the end of the trading day and the re-cycle time method shown in FIG. 8.

At act 1006, the system time input or time check act 810 shown in FIG. 8 is terminated. Preferably, the stopping of the time change timer stops the polling of an external time source that occurs at predetermined or programmed intervals.

At act 1008, the cleaning method commences. Preferably, the trade closing method closes any extra viewing windows, removes any data boarders, and resets window sizes. Preferably, the method then clears the columns and rows that comprise the worksheet(s), and saves the worksheet(s) in a memory.

At act 1010, the trading method continues by saving and then closing the open database files and recording the process start time. Preferably, the closing process act clears the pointers and references within the database fields. In the present embodiment, this reset or initialization is illustrated in FIG. 10 by setting the database references to "nothing," a null character.

At act 1012 the workbooks are closed and the process ends until it is restarted automatically or by a user's initiative.

FIG. 11 illustrates the trade opening method restart, the constant value, and the file name methods. Preferably, the trade opening method re-start can be called by the time-check act 810 of FIG. 8, the re-cycle time act 812, or by an operator through a manual or software actuated means (e.g., a push button, switch, etc.).

Figure 10:
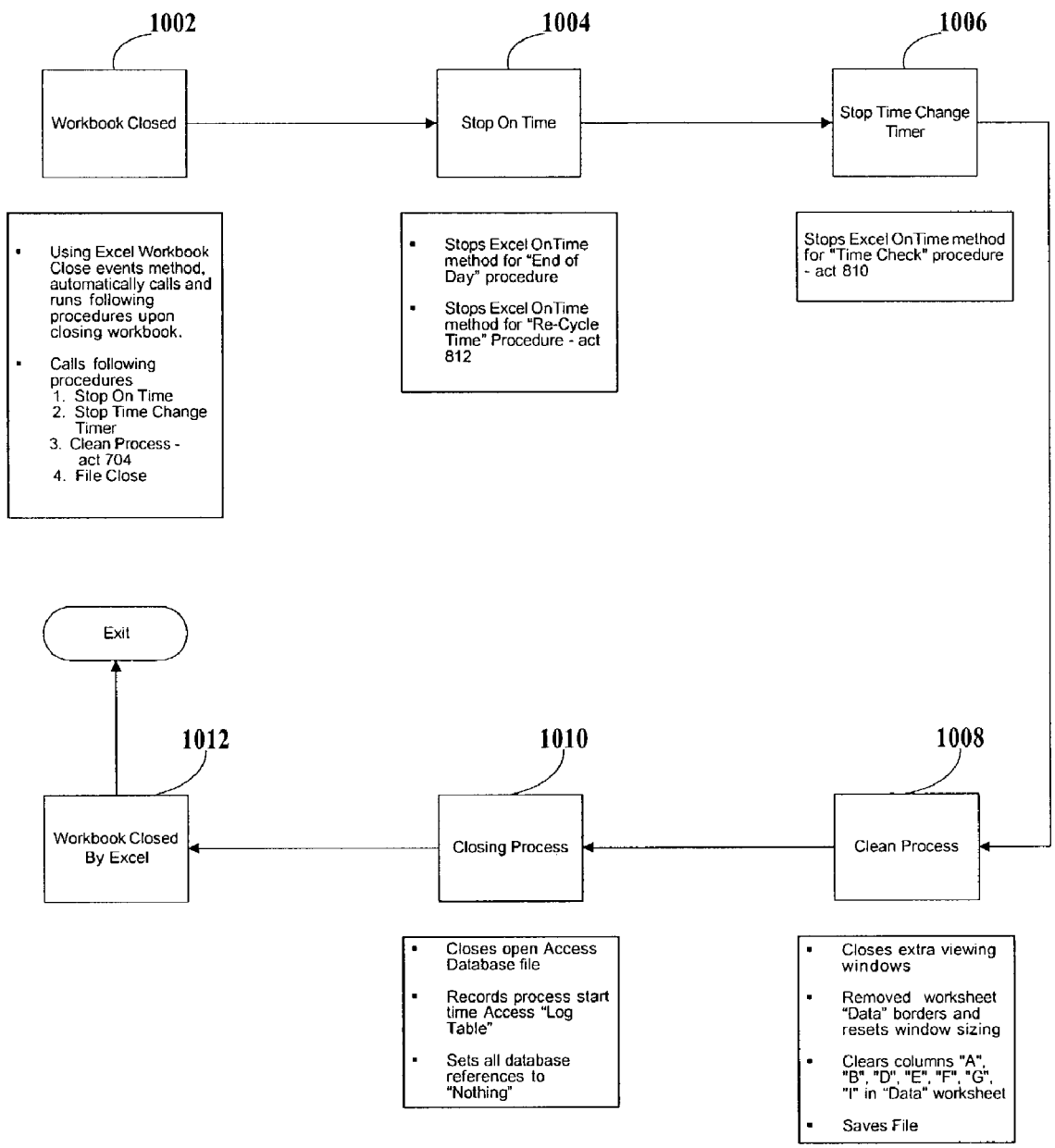
FIG. 10 is a flow diagram of a trade limit closing method.

As shown in FIG. 11 the restart act records the process start time and processes a database file, entitled "Log Table." Once processed, the re-start act 1102 executes the stop on time act 1004 and stop time change time act 1006 shown in FIG. 10, and then executes the clean process act 704, the build worksheet data act 706, the new database file act 708, the optional run on time act 710, the run time change timer act 712, the array build act 714, the format sheet act 716, and the optional act of final selected cells act 718 shown in FIG. 7. In the present embodiment, the specific function, tasks, or routines of these acts are described above.

When the present trade opening method programs constant values or names a file the method launches a constant value method and a name sub-routine method, respectively. At act 1104, the constant value method is programmed with static variable that can be used in the illustrated methods of FIGS. 6-13. Similarly, act 1106 can use a current system, date, and time to derive and create workbook or spreadsheet names and database file names. In the present embodiment, the act 1106 may be called the end of day act 902 shown in FIG. 9, or the new database file act 708 shown in FIG. 7.

When an error occurs, the present trade opening method launches an error method shown in FIG. 12. Preferably, the error act 1202 is a program, procedure, or function that checks for errors such as type mismatches, overflows and underflows, loss of connectivity, etc. In the present embodiment, error detection instructions can be customized and executed by the trade limit opening method shown in FIG. 7, the operational methods shown in FIG. 8, and the closing methods shown in FIG. 9. In alternative embodiments, the error act can comprise intelligent software that uses rule-based adaptations to configure itself to operate optimally to detect problems and generate reports or displays about them.

Each of these methods, the opening, operational, and closing methods are also shown in the flow diagram of an alternative alert embodiment entitled a trade limit method shown in FIG. 13. In FIG. 13, the present trade limit method illustrates the opening method on the left-hand side, the operational method shown near the center and the closing method on the right-hand side. Preferably, the dashed lines indicate the act that are synchronized or rely on a system clock.

The present trade limit method begins with the trade limit opening method previously shown in FIG. 7. At act 702, the method opens a file containing a number of related worksheets (a/k/a "a workbook"). Upon its opening, the present trade opening method calls and runs the routines shown in acts 704-718.

At act 704, the cleaning method commences. Preferably, the present trade opening method closes any extra viewing windows, removes any data boarders, and resets window sizes. Preferably, the method then clears the columns and rows that comprise the worksheet(s), and saves the worksheet(s) in a memory.

At act 706, an array building method identifies the initial month of a contract and builds an array based on that initial month. In a futures Exchange, commodity contracts open and close at different time throughout the year. Based on date comparisons, act 706 synthesizes the contract dates through interprocess communication formulas such as Dynamic Data Exchange ("DDE") formulas programmed within the cells of the worksheet.

At act 708, a database management system opens an existing file or creates a new file. Preferably, the database management system stores information in tables and can conduct searches on data stored in rows and columns. Preferably, a record of transactions or activities, such as a "Log Table," is maintained in the existing or new file.

The present trade opening method continues by defining the end of day and a re-cycle time method at optional act 710. If an Exchange elects to define these parameters, the Exchange enters a time that closes out the monitoring method and a time to re-install the method. When operational, the re-cycle time establishes times or acts as a timer that re-starts the opening procedure. In some embodiments, a re-cycle time can be used to overcome a bug or a deficiency in software that is susceptible to corruption when the software stalls in a wait state, runs for extended periods of times, or fails for another reason. In other embodiments, the re-cycle time can build an archive in programmed increments.

At act 714, the present trade opening method performs an update. When an input disseminates a new price or a change in price for a specific commodity, for example, the array build act analyzes the new price change to determine if the price lies outside of a theoretical no-bust range. If the trade limits of the theoretical no bust range are exceeded, a warning issues and details of the trade, such as a time, price, and trader identities are recorded in the appropriate cell(s) within a worksheet log and/or in one or more selected fields of a database log.

When the details of the trade are recorded in the worksheet and/or the database log, preferably the present trade opening method formats the data, sets the window size, and opens the appropriate Window. In the present embodiment, the details of the trade are recorded in files entitled "Exceed Limit Log" and "Error Log."

At optional act 718, a cursor is placed in one of the cells or fields that exceeded the theoretical no-bust range. Thus, when used in a Futures Exchange, the present opening method identified the commodities being traded, the contract dates, price changes, and made comparisons to a theoretical no-bust range, and when prices lied outside the theoretical no-bust range, issued warnings. Potentially erroneous trades were flagged in a tangible and/or a digital media.

When a price update is received from a quote or data vendor at act 802, preferably, the update method 800 examines the new price to determine if that price exceeds the theoretical no-bust range. Preferably, the price updates selected price and time data in the worksheet cells and/or the database fields at act 804. If the theoretical no-bust range is exceeded, preferably an Exchange control center is notified by a warning. In an audio embodiment, for example, the array building act issues a warning by selecting an audio file such as a "WAV" file. Preferably, the update method 800 updates the exceed trade limit logs with details of the possible erroneous trade in worksheet cells and/or database fields at act 806. Preferably, the update method is coordinated to a time. Preferably, the time is a precise timekeeping signal, such as a clock signal that the present method receives from an atomic clock.

As previously shown in FIG. 8, a system time input or time check at act 810 can be used to re-calculate a synthetic market price and a theoretical no-bust range at pre-determined intervals. In the illustrated method, the synthetic market price and a theoretical no-bust range is calculated in programmed time intervals. Preferably, the time is recorded in a database log that can be used in self-diagnostic routines. For example, if the exemplary time check act 810 does not poll an external timing source at an expected interval, the time check act 810 can record the error in worksheet cells and/or database fields. Once recorded, the time check act 810 can re-start the trade limit opening method by calling a re-start method act 1102 shown in FIGS. 11 and 13.

When operational, the re-cycle time act 812 establishes a time or launches a timer that re-starts the opening method. In the illustrated embodiment, a re-start is programmed to occur at the exemplary Exchange defined time of one second past midnight. Preferably, the trade limit opening method records the restart time in a worksheet cell and/or database field.

The present trade opening method preferably ends automatically or upon demand. An unexpected occurrence or situation, for example, may require an operator to call an "end of the trading day" through a manual or software actuated means (e.g., a push button, switch, etc.). If the end of the trading day is called by an operator, the natural close of the trading day, or for any other reason, the end of day act 902 saves the log sheet in a memory.

In the illustrated embodiment, the "Exceed Limit Log" and the "Error Log" are saved to a memory. Preferably, the "Exceed Limit Log" includes the details of the potentially erroneous trades identified by the trade opening method; while the "Error Log" records the performance of the trade opening method. If there is a deficiency in the functionality of the acts or the program that can be in response to an unforeseen operating condition, for example, a record of those activities are preferably recorded within the "Error Log."

Once the files are saved, the trade closing method shown in FIG. 10 is executed before launching the trade opening method shown in FIG. 7.

When the trade opening method is to be closed at act 1002, preferably the trade closing method launches the routines shown in acts 1004-1012 of FIG. 13.

At act 1004, the present trade closing method begins. Preferably, the trade closing method reset the timers or programs used to define the end of the trading day and the re-cycle time method shown in FIGS. 8 and 13.

At act 1006, the system time input or time check act 810 shown in FIG. 13 is terminated. Preferably, the stopping of the time change timer stops the polling of an external time source that occurs at predetermined or programmed intervals.

At act 1008, the cleaning method commences. Preferably, the trade closing method closes any extra viewing windows, removes any data boarders, and resets window sizes. Preferably, the method then clears the columns and rows that comprise the worksheet(s), and saves the worksheet(s) in a memory.

At act 1010, the trading method continues by saving and then closing the open database files and recording the process start time. Preferably, the closing process act clears the pointers and references within the database fields. In the present embodiment, this reset or initialization is illustrated in FIG. 10 by setting the database references to "nothing," a null character.

At act 1012 the workbooks are closed and the process ends until it is restarted automatically or by a user's initiative. FIG. 13 further illustrates the trade opening method restart, the constant value, and the file name methods. Preferably, the trade opening method re-start can be called by the time-check act 810 of FIG. 13, the recycle time act 812, or by an operator through a manual or software actuated means 1102 (e.g., a push button, switch, etc.).

The present embodiments of the system and method described above provide Exchanges and users with a flexible approach and structure that minimize the harmful effects of selected trades executed in error. Preferably, the system and method can intervene by automatically identifying a trade that would appear to be outside of an expected, a predicted, or a prevailing market range of prices. A price that is not consistent with the history of a contract, is not consistent with the history of an underlying commodity, is not consistent with the price of a highly correlated investment, or is not consistent with, or bears no relationship to, a fair market value can be identified. In some embodiments, a program may analyze trades and make Exchange control centers aware, and in some embodiments, market participants aware of trades execute in error, before market participants discover them.

The above-described embodiments, scale well to large networks, new products, or the large volatility that occurs in the markets that trade popular contracts. These embodiments do not require repeated modifications. Preferably, the above-described embodiments provide a safe harbor to the parties of an erroneous trade, in which the error is based on the price at which the trade is made. The above describe embodiments describe the resolution of an erroneous trade the lies outside of the theoretical no-bust range of prices. While the resolution can result in a decision to cancel that trade, in some alternative embodiments, Exchanges may also sustain the trade but modify its terms.

Although the embodiments described above have primarily been explained through a futures market, the invention also facilitates any exchange between buyers and sellers, including markets that exchange equities, debt, investment indices, and other investments as well as any commodity or combination or series of commodity contracts, such as bundles that can comprise the purchase of one of a series of consecutive contracts. Moreover, while it is understood that the embodiments of the invention are directed to correcting errors in the price in which a contract or investment is traded, in some alternative embodiments, the theoretical no-bust range may identify trades in which the error is based on the number of contracts traded.

While some embodiments of the invention have been described, it should be apparent that many more embodiments and implementations are possible and are within the scope of this invention. It is intended that the foregoing detailed description be regarded as illustrative rather than limiting, and that it be understood that it is the following claims, including all equivalents, that are intended to define the spirit and scope of this invention.

What is claimed is:

1. An alert system for notifying an Exchange's staff of a trade that appears to be outside of an expected market range of prices, comprising:
    an input device that provides financial data used to generate a no-bust range of prices;
    a determination logic that derives the no-bust range of prices within which an erroneous trade for an exchange-traded financial instrument can not be cancelled based on the data received from the input device;
    an evaluation logic that monitors trades of financial instruments matched in an automated matching system of the Exchange and compares those trades to the no-bust range of prices; and
    an alert logic that provides a notification when the evaluation logic identifies a potentially erroneous trade that lies outside the no-bust range of prices.

2. The alert system of claim 1, where the erroneous trade is cancelled at the Exchange.

3. The alert system of claim 1, wherein the notification consists of any one of a visual alert, an audio alert, or combination thereof.

4. The alert system of claim 1, wherein the notification comprises an alert perceptible to a sense of touch.

5. The alert system of claim 1, wherein the notification comprises a combination of at least two of an audio alert, a visual alert, and an alert perceptible to a sense of touch.

6. The alert system of claim 1, wherein the notification indicates that the no-bust range of prices was based on electronic exchange data.

7. The alert system of claim 5, wherein the notification indicates that the no-bust range of prices was also based on a live, open outcry trading data.

8. The alert system of claim 1, wherein the notification indicates the product that was traded.

9. The alert system of claim 1, wherein the notification indicates the level of trading experience of a market participant.

10. The alert system of claim 1, wherein the notification indicates a frequency that a market participant submits orders in error.

11. The alert system of claim 1, wherein the determination logic further derives a synthetic market price in which the no-bust range of prices is a fixed number of ticks above the synthetic price and a fixed number below the synthetic market price.

12. The alert system of claim 1, wherein the separation between an upper limit of the no-bust range of prices and a synthetic market price is not equal to the separation between a lower limit of the no-bust range of prices and the and the synthetic market price.

13. The alert system of claim 1, wherein the no-bust range is predicted from the cash prices of a physical commodity.

14. The alert system of claim 1, wherein the no-bust range of prices is predicted from prices tracked from a live, open outcry-trading floor.

15. The alert system of claim 1, wherein the no-bust range of prices is predicted from prices of a correlated market.

16. The alert system of claim 1, wherein the no-bust range of prices is predicted from prices of a plurality of correlated markets.

17. The alert system of claim 1, wherein the no-bust range of prices is predicted from prices that accurately reflect a futures marketplace.

18. The alert system of claim 1, further comprising a communication system for notifying market participants of a potentially erroneous trade.

19. The alert system of claim 1, wherein the input device comprises a device that provides quotes.

20. The alert system of claim 1, wherein the input device comprises quote devices and data devices.

21. The alert system of claim 20, wherein the input device comprises a device that provides data selected from the group consisting of bid prices, offer prices, trade prices, and daily settlement prices.

22. The alert system of claim 1, wherein the determination logic and evaluation logic are resident to a server.

23. The alert system of claim 1, wherein the determination logic and evaluation logic are resident to a server cluster.

24. The alert system of claim 1, wherein the determination logic, evaluation logic, and alert logic are resident to a computer.

25. The alert system of claim 1, wherein the determination logic comprises a first processor.

26. The alert system of claim 25, wherein the evaluation logic comprises a second processor.

27. The alert system of claim 26, wherein the alert logic comprises a third processor.

28. The alert system of claim 1, wherein the potentially erroneous trade comprises a trade in an equities market.

29. The alert system of claim 1, wherein the no-bust range of prices comprises more than one no-bust range of prices.

30. The alert system of claim 1, wherein the potentially erroneous trade is identified by a request made by a market participant.

31. An alert system for notifying an Exchange of a trade that appears to be outside of an expected range of prices, comprising: an input device that provides financial data used to generate a no-bust range of prices; a determination logic that derives the no-bust range of prices from data received from the input device; an evaluation logic that monitors trades matched in an electronic Exchange and compares those trades to the no-bust range; and an alert logic that notifies an Exchange when the evaluation logic identifies a potentially erroneous trade that lies outside the no-bust range of prices.

32. The alert system of claim 31, wherein the notification comprises at least one alert selected from the group consisting essentially of an audio alert, a visual alert, and an alert perceptible to a sense of touch.

33. The alert system of claim 31, wherein the notification indicates that the theoretical no-bust range of prices was based on electronic exchange data.

34. The alert system of claim 31, wherein the notification indicates that the theoretical no-bust range of prices was based on a live, open outcry trading data.

35. The alert system of claim 31, wherein the notification indicates the product that was traded.

36. A method of notifying an Exchange of a trade that potentially lies outside of an expected range of prices, comprising:

monitoring an input range of prices;

deriving a no-bust range of prices within which an erroneous trade for an exchange-traded financial instrument can not be cancelled based on the input range of prices;

monitoring transactions executed by an automated matching system of an Exchange;

comparing the prices of the transactions to the no-bust range of prices to determine if a potentially erroneous trade can be cancelled; and notifying the Exchange when one of the prices of the transactions lies outside of the no-bust range of prices.

37. The method of claim 36, wherein the act of notifying the Exchange comprises issuing an audio alert.

38. The method of claim 36, wherein the act of notifying the Exchange comprises issuing a visual alert.

39. The method of claim 36, wherein the act of notifying the Exchange comprises issuing an alert perceptible to a sense of touch.

40. The method of claim 36, wherein the act of notifying the Exchange comprises issuing a combination of at least two or more of an audio alert, a visual alert, and an alert perceptible to a sense of touch.

41. The method of claim 36, wherein the act of notifying indicates that the no-bust range of prices was based on electronic exchange data.

42. The method of claim 36, wherein the act of notifying indicates that the no-bust range of prices was based on a live, open outcry trading data.

43. The method of claim 36, wherein the act of notifying indicates the product that was traded.

44. The method of claim 36, wherein the act of notifying indicates the level of experience of a market participant.

45. The method of claim 36, wherein the act of notifying indicates one of a frequency that a market participant submits orders in error, executes erroneous trades, or cancels trades.

46. The method of claim 36, further comprising deriving a synthetic market price in which the theoretical no-bust range of prices is a fixed number of ticks above the synthetic market price and a fixed number of ticks below the synthetic market price.

47. The method of claim 46, wherein the separation between an upper limit of the no-bust range of prices and the synthetic market price is not equal to the separation between a lower limit of the no-bust range of prices and the and the synthetic market price.

48. The method of claim 36, wherein the theoretical no-bust range is predicted from the cash prices of a physical commodity.

49. The method of claim 36, wherein the no-bust range of prices is predicted from historical prices tracked from a live, open outcry-trading floor.

50. The method of claim 36, wherein the no-bust range of prices is predicted from prices of a correlated investment.

51. The method of claim 36, wherein the no-bust range of prices is predicted from prices of a plurality of correlated investments.

52. The method of claim 36, wherein the no-bust range of prices is predicted from prices of a commodity contract.

53. The method of claim 36, wherein the no-bust range of prices is predicted from prices of an equity investment.

54. The method of claim 36, wherein the no-bust range of prices is predicted from prices of a debt investment.

55. The method of claim 36, further comprising notifying market participants of a potentially erroneous trade.

56. The method of claim 36, further comprising matching seller's offers with buyers bids with buyer's bids on a first in, first out basis.

57. The method of claim 36, further comprising matching seller's offers with buyers bids with buyer's bids on an allocation-matching basis.

58. The method of claim 36, further comprising matching seller's offers with buyers bids with buyer's bids on a hybrid price, time priority basis.

59. The method of claim 36, wherein the act of deriving a no-bust range of prices comprises deriving more than one no-bust range of prices.

60. The method of claim 36, further comprising receiving a request to cancel a potentially erroneous trade.

61. The method of claim 36, wherein the act of deriving a no-bust range of prices occurs in real-time.

62. The method of claim 36, wherein the act of monitoring transactions executed by an electronic Exchange occurs in real-time.

63. The method of claim 36, wherein the act of comparing the prices of the transactions to the theoretical no-bust range of prices occurs in real-time.

64. The method of claim 36, wherein the act of notifying an Exchange occurs in real-time.

* * * * *

UNITED STATES PATENT AND TRADEMARK OFFICE
CERTIFICATE OF CORRECTION

| | | |
|---|---|---|
| PATENT NO. | : 7,464,055 B2 | Page 1 of 1 |
| APPLICATION NO. | : 10/405025 | |
| DATED | : December 9, 2008 | |
| INVENTOR(S) | : Kelly et al. | |

It is certified that error appears in the above-identified patent and that said Letters Patent is hereby corrected as shown below:

On the title page,

[*] Notice: Subject to any disclaimer, the term of this patent is extended or adjusted under 35 USC 154(b) by 1129 days Delete the phrase "by 1129 days" and insert -- by 1217 days --

Signed and Sealed this

Nineteenth Day of January, 2010

David J. Kappos
*Director of the United States Patent and Trademark Office*